United States Patent [19]

Appeldorn et al.

[11] Patent Number: 4,775,219
[45] Date of Patent: Oct. 4, 1988

[54] CUBE-CORNER RETROREFLECTIVE ARTICLES HAVING TAILORED DIVERGENCE PROFILES

[75] Inventors: Roger H. Appeldorn, White Bear Lake, Minn.; John C. Nelson; Mark E. Gardiner, both of Santa Rosa, Calif.; Timothy L. Hoopman, River Falls, Wis.

[73] Assignee: Minnesota Mining & Manufacturing Company, St. Paul, Minn.

[21] Appl. No.: 933,470

[22] Filed: Nov. 21, 1986

[51] Int. Cl.[4] .................. G02B 5/124; G02B 5/122; G02B 5/136

[52] U.S. Cl. ..................... 350/103; 350/102; 350/109

[58] Field of Search ............. 350/102, 103, 97, 100, 350/129, 109, 613, 618, 622

[56] References Cited

U.S. PATENT DOCUMENTS

| 3,712,706 | 1/1973 | Stamm | 350/103 |
|---|---|---|---|
| 3,817,596 | 6/1974 | Tanaka | 350/103 |
| 3,833,285 | 9/1974 | Heenan | 350/103 |
| 4,206,969 | 6/1980 | Cobb | 350/126 |
| 4,243,618 | 6/1981 | Van Arnan | 264/1 |
| 4,576,850 | 3/1986 | Martens | 428/156 |
| 4,582,885 | 4/1986 | Barber | 528/28 |
| 4,588,258 | 5/1986 | Hoopman | 350/103 |

OTHER PUBLICATIONS

"Study of Light Deviation Errors in Triple Mirrors and Tetrahedral Prisms," P. R. Yoder, *Journal of the Optical Society of America*, vol. 48, No. 7, Jul., 1958.
"Optics of Corner Cube Reflectors," N. E. Rityn, *Theory and Experiment*, Page 198 et seq., (UDC 538.318:531.719.24).
"Simple Model of Corner Reflector Phenomena", H. D. Eckhardt, *Applied Optics*, vol. 10, No. 7, Jul., 1971.
CSC/TM-77/6054, Description of the Cube Corner Retroreflector Modeling Programs (Solid and Hollow) for Calculating Far-Field Diffraction Patterns, J. G. Kirk, Feb. 1977, prepared for National Aeronautics and Space Administration, Goddard Space Flight Center, Contract NAS 5-11999, Task Assignment 842.

*Primary Examiner*—John K. Corbin
*Assistant Examiner*—Ronald M. Kachmarik
*Attorney, Agent, or Firm*—Donald M. Sell; Roger R. Tamte

[57] ABSTRACT

Cube-corner retroreflective article having improved divergence profiles. The three lateral reflecting faces of the cube-corner retroreflective elements are formed by three intersecting sets of parallel V-shaped grooves, and at least one of the sets includes, in a repeating pattern, at least two groove side angles that differ from one another. Thereby the array of cube-corner retroreflective elements is divided into repeating sub-arrays that each comprise a plurality of cube-corner retroreflective elements in a plurality of distinctive shapes that retroreflect incident light in distinctively shaped light patterns.

79 Claims, 10 Drawing Sheets

CUBE-CORNER RETROREFLECTIVE ARTICLES HAVING TAILORED DIVERGENCE PROFILES

FIELD OF THE INVENTION

The present invention is directed to cube-corner retroreflective articles, particularly to such articles in which the cube-corner retroreflective elements are formed by three intersecting sets of parallel V-shaped grooves.

BACKGROUND OF THE INVENTION

The light reflected from a retroreflective article generally spreads as it leaves the article, assuming a cone-like pattern centered on the path the light traveled to the reflector. Such a spreading is necessary for practical utility of the retroreflective article. For example, light from the headlamps of an oncoming vehicle, reflected back toward the vehicle by a retroreflective sign, must diverge sufficiently as it leaves the sign to reach the eyes of the driver, who is positioned off-axis from the headlamp beam. In conventional cube-corner retroreflective articles, this cone-like spreading of retroreflected light is obtained through imperfections in the cube-corner retroreflective elements (e.g., non-flatness of the faces, unintended tilting of the faces from their mutually perpendicular positions, etc.) and through diffraction caused because the retroreflected light exits through an aperture defined by the base edges of the three reflecting faces (see Stamm, U.S. Pat. No. 3,712,706).

However, the spreading of light from cube-corner retroreflective articles has important deficiencies: the cone of retroreflected light is often too narrow for many uses that require reflected light to be seen farther off-axis; and the three-sided nature of the cube-corner retroreflective elements gives the retroreflected cone of light an undesirable asymmetric shape. The result is that cube-corner retroreflective articles suffer from a variation in retroreflective brightness when viewed from different presentation angles (a glossary of terms is at the end of the specification). These deficiencies can be sufficiently severe that two persons sitting side-by-side in a vehicle passing a sign covered with cube-corner retroreflective sheeting may have distinctly different perceptions as to the brightness of the sign.

Tanaka, U.S. Pat. No. 3,817,596 increases the divergence or spreading of light rays from a cube-corner retroreflective article by deliberately tilting the faces of the cube-corner retroreflective elements out of perpendicularity or orthogonality. As taught in papers such as P. R. Yoder, "Study of Light Deviation Errors in Triple Mirrors and Tetrahedral Prisms," *Journal Of The Optical Society of America*, Vol. 48, No. 7, July, 1958; N. E. Rityn, "Optics of Corner Cube Reflectors," *Theory and Experiment*, Page 198 et seq (UDC 538.318:531.719.24;) and H. D. Eckhardt, "Simple Model of Corner Reflector Phenomena," *Applied Optics*, Vol. 10, No. 7, July, 1971, such a tilting of the faces results in light reflected by the cube-corner retroreflective element being divided into as many as six different beams that diverge away from the reference axis of the element and thereby spread the light through a broader range of angles.

Although the spreading of light taught in U.S. Pat. No. 3,817,596 increases the observation angles from which the article may be seen by retroreflection, no effort is made to avoid the basic asymmetry that arises from the three-sided nature of a cube-corner retroreflective element. Further, the spreading reduces retroreflective brightness at commonly experienced smaller observation angles, i.e., the narrow angles near the reference axis, because the light that would ordinarily have been directed to such smaller observation angles is spread through an enlarged region of space. Much of the spread light is wasted, since the article will generally not be viewed from points throughout the enlarged space, and this lost light leaves the retroreflective brightness of the article significantly reduced (see FIG. 6 of U.S. Pat. No. 3,817,596).

Heenan, U.S. Pat. No. 3,833,285, changes the divergence or spreading of light from a cube-corner retroreflective article in a different manner, specifically by incorporating into the article a set of special cube-corner retroreflective elements arranged in a row. In each of these special cube-corner retroreflective elements, two of the faces intersect in a line that is aligned along the length of the row of elements, and the dihedral angle at the intersection of the two faces is enlarged beyond the conventional 90 degrees, e.g., to 90° 30', with the result, as discussed in the publications listed above, that light retroreflected by those elements is split into two beams which diverge along the length of the row. It is contemplated that in different elements within the row the dihedral angle may be enlarged different amounts so as to spread light into an elongated pattern.

An important disadvantage of a retroreflective article as taught in U.S. Pat. No. 3,833,285 is the fact that, in many retroreflective articles, such as traffic control signs, it could be distracting to have a single isolated row of retroreflective elements that distributes light in patterns that are noticeably different from those of other retroreflective elements of the article. For example, instead of seeing a uniformly lit retroreflective sign, an observer would see variations in brightness that could distract from an understanding of the information carried on the sign. Further, a product as described in U.S. Pat. No. 3,833,285 requires the precise manufacture of individual pins that are subsequently bundled together to form the row of elements, and it is difficult to precisely form and group together such distinct pins to obtain retroreflection within desired tolerances.

In summary, the previous efforts at changing the pattern or divergence profile of retroreflected light from cube-corner retroreflective articles have still left such articles with basic deficiencies that limit their utility.

SUMMARY OF THE INVENTION

The present invention provides cube-corner retroreflective articles of a new type which may be individually tailored so as to distribute light retroreflected by the articles into a desired pattern or divergence profile. In brief summary, the new retroreflective articles carry on one side an array of cube-corner retroreflective elements, the three lateral reflecting faces of the elements being formed by three intersecting sets of parallel V-shaped grooves, with at least one of the sets including, in a repeating pattern, a groove side angle that differs from another groove side angle of the same set. As a consequence of the repeating variation in groove side angle, the array of cube-corner retroreflective elements is divided into repeating sub-arrays that each comprise a plurality of cube-corner retroreflective elements in a plurality of distinctive shapes. At least one of the distinctive shapes is for a non-orthogonal cube-corner retroreflective element, by which it is meant that at least one face of the element is tilted at an angle that differs from the angle which would be required for all dihedral angles within the element to be orthogonal; even though the dihedral angles are not all orthogonal, such an element is still regarded as a cube-corner retroreflective element herein, because it closely resembles the ideal cube-corner retroreflective element in shape and function.

The distinctively shaped cube-corner retroreflective elements retroreflect incident light in distinctively shaped light patterns. The overall pattern of the light retroreflected by an article of the invention, i.e., the divergence profile for the article, comprises a summation of the different light patterns in which the distinctively shaped cube-corner retroreflective elements in a sub-array retroreflect incident light, and the individual distinctively shaped light patterns can be selected to give the overall pattern a desired shape or contour.

A surprising flexibility is possible in the shape of the light pattern produced by an article of the invention. The flexibility is surprising because the individual cube-corner retroreflective elements have so much in common with one another. For example, elements adjacent to one another along a groove have a common face angle, because those faces are all formed by the same groove side angle. Further, the base planes of all the elements have the same triangular shape (since the intersecting sets of parallel grooves define a certain triangular shape), and all the elements within a sub-array are fixed in the same orientation to one another. Despite such apparent limitations, retroreflective articles have a great flexibility, so that as will be detailed herein, they can be tailored to achieve important novel effects, including the following:

(1) light retroreflected by a traffic control sign of the invention can be configured so that a greater proportion of the light will be seen only by those who need to see it, e.g., by the driver of a vehicle is the vehicle approaches a sign, rather than being distributed throughout a large region in which no retroreflection is needed; in other words, the divergence profile from a sign of the invention can be asymmetric, but it is a desirable asymmetry by which light is distributed in more useful patterns;

(2) retroreflective signs can be provided that have improved uniformity in brightness over a wide range of observation positions; e.g., the rotational asymmetry of the cone of retroreflected light arising from the three-sided nature of cube-corner elements can be reduced and more than that, a composite cone of light can be provided with a divergence profile that more closely matches the expected observation profile for the sign, e.g., more fully encompasses the path of a driver's eyes as the driver's vehicle moves along a roadway;

(3) retroreflective signs can be provided to function only at specified vehicle-to-sign distances so as to provide special emergency warnings;

(4) retroreflective articles can be provided that are efficient at large displacements, e.g., for advertising signs, traffic delineators, etc.;

(5) retroreflective articles can be provided that make graphic images appear to be suspended in space in front of an observer; and (6) retroreflective articles can be provided that have surprising tolerance to possible dimensional errors arising during manufacture of the articles and to dimensional changes arising during use of the articles.

All of these advantages greatly enhance the utility of cube-corner retroreflective products, and make possible results that have never before been possible in the art of retroreflective articles.

DETAILED DESCRIPTION

Figure 1:
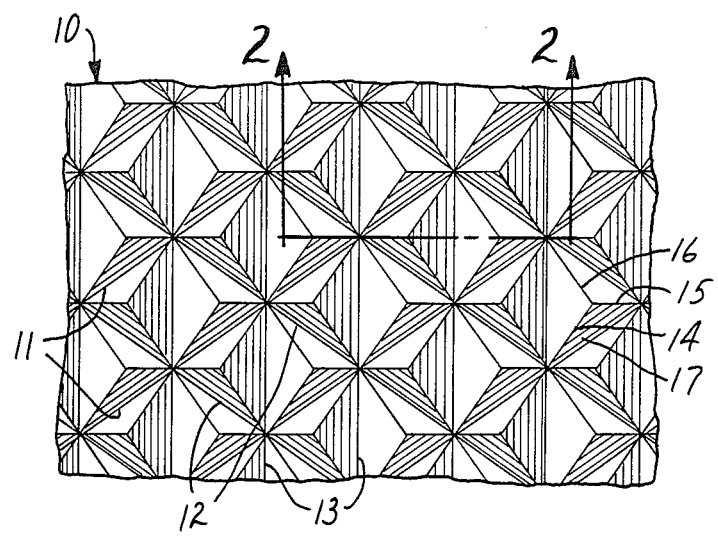
Figure 2:
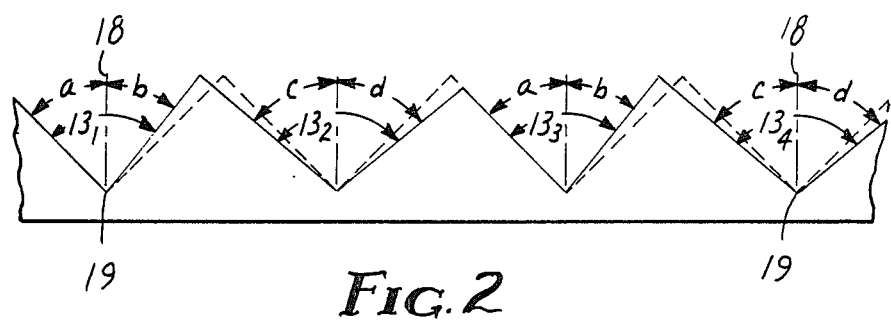

A representative retroreflective sheet material 10 of the invention is shown from the back of the sheet material in FIG. 1 and in section in FIG. 2. As shown in FIG. 1, the configured back surface of the sheet material 10 is defined by three intersecting sets 11, 12, and 13 of parallel V-shaped grooves which form a dense or fully packed array of cube-corner retroreflective elements. The angles for the sides of the grooves, i.e., the groove side angles, are chosen so that the dihedral angles formed at the lines of intersection of the grooves, e.g., the lines 14, 15 and 16 for the representative cube-corner retroreflective element 17 in FIG. 1, are at least approximately 90°. However, at least one of the intersecting sets of parallel grooves includes, in a repeating pattern, grooves having one or both groove side angles different from at least one other groove side angle of the same set. By "repeating pattern," it is meant that a particular distinctive groove side angle(s) occurs periodically across the array of cube-corner retroreflective elements, i.e., is spaced the same number of grooves from its previously occurring position in the array.

FIG. 2 shows part of a representative set of grooves having groove side angles that differ in an exaggerated manner from other groove side angles of the same set. Specifically, FIG. 2 shows a set of grooves 13 from the sheet material of FIG. 1, i.e., $13_1$, $13_2$, $13_3$, and $13_4$. In this set of grooves, there are four different groove side angles "a," "b," "c," and "d," extending between the sides of the grooves and a plane 18 that is perpendicular to a plane defined by the bottom edges 19 of the grooves. The groove side angles are arranged in an a-b-c-d-a-b-c-d repeating pattern. The groove side angle "a" in this representative set is an angle that would in this representative article form an orthogonal dihedral angle at the intersection of the groove side with groove sides of the other two sets of grooves (such groove side angles are sometimes termed "orthogonal-producing" herein), and the groove side angles "b," "c," and "d" do not produce orthogonal dihedral angles. The position of the groove sides that would be orthogonal-producing is shown in dotted lines in FIG. 2, and as will be seen, the angle "b" is less than that needed to obtain orthogonality, and the angles "c" and "d" are larger than that needed to obtain orthogonality.

Figure 3:
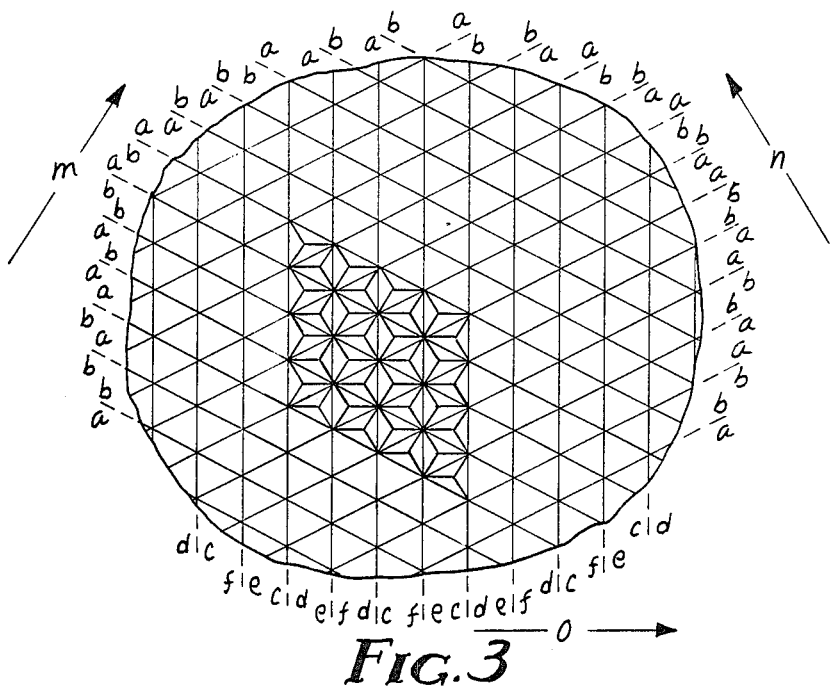
Figure 4:
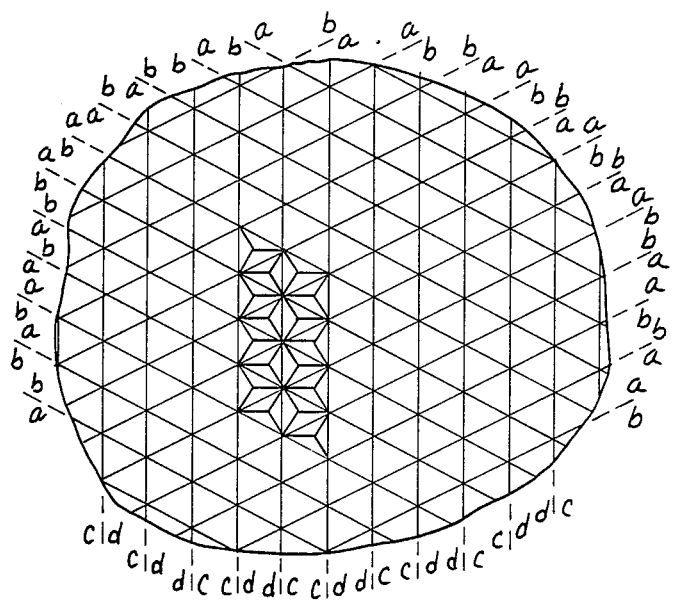

FIGS. 3 and 4 show in schematic plan view representative patterns of grooves for a retroreflective article of the invention. In these figures, each line represents one V-shaped groove, with the letter on each side of a line representing the groove side angle on that side of the groove. As illustrated by these examples, each of the three sets of grooves can have a different repeating pattern of groove side angles. In FIG. 3, one set has an a-b-b-a pattern, a second set has an a-b-a-b-b-a-b-a pattern, and the third set has a c-d-e-f-d-c-f-e pattern. In FIG. 4 the different grooving patterns are, respectively, an a-b-b-a pattern, an a-b-a-b-b-a-b-a pattern, and a c-d-d-c pattern.

The repeating patterns of grooves form periodically repeating groupings of cube-corner retroreflective elements, or sub-arrays, distributed across one large-area side of the retroreflective article. With the grooving pattern shown in FIG. 3, sub-arrays consisting of potentially sixteen distinctive cube-corner retroreflective elements are formed; i.e., assuming a, b, c, d, e and f are all different from one another, there are sixteen cube-corner retroreflective elements of distinctive shape in the sub-array. These sixteen elements occur twice, or as pairs, in each sub-array of the FIG. 3 article, with the elements of each pair being rotated 180° from one another. The different elements of a pair may be denominated for convenience as left-hand elements and right-hand elements. Thus, there are a total of thirty two cube-corner retroreflective elements in the illustrated sub-array. Since groove side angles may be adjusted or chosen independently from one another, there need not be pairs of elements, but instead, if desired, the elements can all be different from one another. The pairs of elements for the array of FIG. 3 occur because of the particular repeating patterns of grooves used in the array, e.g., by the rotation of the a-b pattern to a b-a pattern in an adjacent groove. Whatever repeating patterns are used, so long as the patterns are periodic, the sub-arrays will all be identical to one another.

It is not essential that all the groove side angles in a sub-array differ from one another. For example, c and e could be identical to one another, or other groove side angles could be identical. However, at least one of the three sets of grooves, and for greater control at least two or all three sets, include at least one groove side angle that differs from at least one other groove side angle in the same set, with the result that a plurality (i.e., at least two) of the cube-corner retroreflective elements in a sub-array are distinctively shaped, i.e., have a shape different from one another. This difference in shape is more than simply a rotation of an element about its axis, such as the 180° rotation noted above or the similar 180° rotation of the cube-corner elements of U.S. Pat. No. 4,588,258, but instead arises, for example, because a particular face of an element is not orthogonal-producing in one shape and the corresponding face in another shape is orthogonal-producing, or because a particular face deviates from orthogonal-producing in one shape by a different amount than the corresponding face deviates from orthogonal-producing in another shape. The plurality of distinctive shapes may occur because there are a plurality of different groove side angles in a set, and/or because two or all three sets include at least one groove side angle that differs from other groove side angles of the same set. Preferably, several or substantially all of the groove side angles in a repeating pattern are not orthogonal-producing, and several or substantially all the individual cube-corner retroreflective elements in a sub-array are distinctive in shape from other cube-corner retroreflective elements in the sub-array.

The different shapes are a consequence of the variation in groove side angles, and the potential number of distinctively shaped or unique cube-corner retroreflective elements ($N_u$) in a sub-array may be determined by the following formula:

$$N_u = 2(mno)/F$$

where m, n, and o represent the number of grooves in the basic repeating pattern in the three different sets of grooves (see FIG. 3), and where F is the largest single whole-number factor (which can include the number "1") that can be divided evenly into each of the individual numbers "m," "n," and "o" (note that a repeating pattern is composed of complete grooves). The term "potential" is applied since the full number of distinctively shaped elements given by the formula need not be realized if some of the groove side angles in a repeating pattern are identical.

The potential number of distinctively shaped cube-corner retroreflective elements is preferably less than the total number of combinations in which m, n, and o numbers of grooves could be combined (calculated by multiplying m, n, and o together, and then multiplying the multiplication product by 2, because there are two sides to each groove). This preference can be illustrated with the following two illustrative cases. In the first case, m=5, n=6 and o=7, and the calculated number of combinations, i.e., the number of different cube-corner retroreflective elements in which the different groove side angles may be combined, is 420. Furthermore, with those numbers of grooves in the repeating pattern, each one of the combinations is realized. That is, as confirmed by the above formula for potential number, there are potentially 420 different cube-corner retroreflective elements in the sub-array.

In the second case, m=6, n=6, and o=6, and the calculated number of cube-corner retroreflective elements into which that number of different grooves may be combined is 432. However, the potential number of cube-corner retroreflective elements, as confirmed by the above formula, is 72.

The fact that in the second case there can only be 72 different cube-corner retroreflective elements in a sub-array instead of the 432 different possible combinations is advantageous, because of the flexibility given the designer of the article. That is, the designer can choose from the 432 different possible cube-corner retroreflective elements a set of 72 elements that he or she wishes to use to achieve the desired divergence profile. By contrast, in the first case, the designer would be required to use all 420 different possible cube-corner retroreflective elements in a sub-array of 420 elements, thereby imposing limitations on the divergence profile that can be designed.

The freedom of the designer to select from among a group of different combinations can be indicated by a design efficiency factor which is calculated by dividing the total number of face angles in a sub-array (equal to the summation of the grooves along each of the three axes in a sub-array multiplied by two), by the total number of unique cube-corner retroreflective elements in the sub-array, multiplied by 100. In equation form, using the nomenclature for the formula stated above, the relationship is:

Design Efficiency Factor = $(2)(m+n+o)(100)/N_u$.

For the first case stated above, the Design Efficiency Factor = $(2)(18)(100)/420 = 8.6\%$.

For the second illustrative case, the Design Efficiency Factor = $(2)(18)(100)/72 = 50\%$.

A variety of different cases are listed in the following Table I and show how a high design efficiency factor, which is desirable, can be obtained. Best results are achieved with a Design Efficiency Factor of at least 25 percent, and more preferably, 50 or 100 percent.

TABLE I

| Number Of Grooves | | | Number Of Face Angles | Total Possible Combinations | Number $N_u$ Of Unique Cube-Corner Retroreflective Elements | Design Efficiency Factor (%) |
|---|---|---|---|---|---|---|
| m | n | o | | | | |
| 1 | 2 | 3 | 12 | 12 | 12 | 100 |
| 2 | 2 | 2 | 12 | 16 | 8 | 150 |
| 2 | 3 | 4 | 18 | 48 | 48 | 75 |
| 3 | 3 | 3 | 18 | 54 | 18 | 100 |
| 2 | 2 | 5 | 18 | 40 | 40 | 45 |
| 3 | 4 | 5 | 24 | 120 | 120 | 20 |
| 4 | 4 | 4 | 24 | 128 | 32 | 75 |
| 3 | 3 | 6 | 24 | 108 | 36 | 66.7 |
| 4 | 5 | 6 | 30 | 240 | 240 | 12.5 |
| 5 | 5 | 5 | 30 | 250 | 50 | 60 |
| 5 | 6 | 7 | 36 | 420 | 420 | 8.6 |
| 6 | 6 | 6 | 36 | 432 | 72 | 50 |
| 10 | 10 | 10 | 60 | 2000 | 200 | 30 |
| 9 | 10 | 11 | 60 | 1980 | 1980 | 3 |

In some articles of the invention the array of cube-corner elements is not fully packed, i.e., there is spacing between the elements; for example, a flat-surfaced space may be included to allow light transmission through the article, as to allow light from an automobile tail lamp to be directly transmitted through the article. Or, arrays may be prepared in which a portion of the array that might be occupied by a cube-corner element, i.e., an area enclosed by the intersection of three grooves, is occupied by other structure. The equations above apply to articles in which cube-corners are present in all locations lying between three intersecting grooves and can be modified when only a portion of the surface is provided with cube-corner elements.

Each sub-array of cube-corner retroreflective elements in an article of the invention is preferably of a size too small to be resolved by the human eye when the eye is positioned at a typical viewing position in which observers see the retroreflective article. It is generally stated that to be not resolvable a distinctive portion of a surface should subtend no more than about 1 milliradian of arc of a viewer's field of view. Since the viewing distance for retroreflective articles of the invention is typically known, e.g., can be the minimum distance from which a traffic control sign will be viewed, the resolution size for a sub-array of a retroreflective article of the invention can be readily determined. Most overhead traffic signs are viewed from distances of at least 100 feet (30 meters), most roadside traffic signs are viewed from at least 50 feet (15 meters), and most vehicular license plates are viewed from at least 20 feet (6 meters), which means that sub-arrays having lineal dimensions of no more than, respectively, 1.25 inch (3.2 centimeters), 0.625 inch (1.6 centimeters), and 0.25 inch (0.6 centimeter), will not be resolvable on such signs or plates. Since articles of the invention generally include thousands of cube-corner retroreflective elements per square inch (hundreds per square centimeter), and a sub-array generally includes only a few hundred elements, the sub-arrays can be very small and impossible to resolve. Most often the sub-arrays have no lineal dimension larger than about 0.5 or 1 centimeter.

Figure 5:
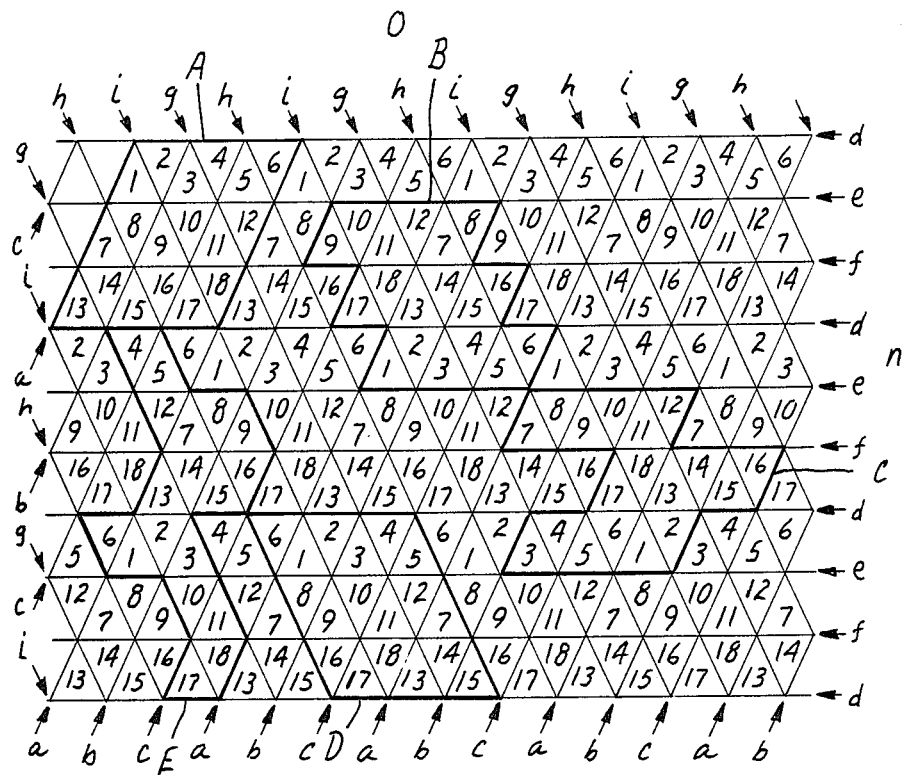

Resolution of individual sub-arrays is further inhibited by the fact that there is very low visual contrast between the sub-arrays, and a sub-array may take varying shapes within the same article. That fact is illustrated in FIG. 5 which shows a pattern of grooves in an article of the invention using a repeating pattern of a-b-c-a-b-c in one set of grooves, a pattern of d-e-f-d-e-f in a second set of grooves, and a g-h-i-g-h-i-g pattern in a third set of grooves. The different cube-corner elements of the array, i.e., the triangular shapes, are each identified with a number; the same number is used for cube-corner elements that are defined by the same combination of grooves. Thus, the number 1 is used for cube-corner elements defined by the grooves, a, i, and e. The normal configuration for a sub-array would be a parallelogram as marked A in FIG. 5, but it should be noted that there are other outlines for a complete set of the cube-corner elements of a sub-array, that is, the polygons B, C, D, and E also enclose the same elements as are enclosed in the polygon A. Thus, the eyes of a viewer may tend not to isolate a particular sub-array since that sub-array has a variety of different shapes in the same article.

The individual groove side angles in each repeating pattern may be such as to produce orthogonality or non-orthogonality, though as noted, there will be at least one groove side angle in at least one set that is different from another groove side angle in the set, meaning that there must be at least one groove side angle in the set that is not orthogonal-producing. The amount of excess or deficiency from an angle that would be orthogonal-producing is generally a few arc-minutes, i.e., about 15-30 arc-minutes or less, though larger deviations can be used. The face angles needed to obtain an orthogonal cube-corner retroreflective element are established by the shape of the triangle defined by the intersecting sets of grooves, i.e., by the base plane of the cube-corner retroreflective elements. Preferably, the chosen groove side angles are obtained in the tooling from which articles of the invention are molded to within plus-or-minus about one-half arc-minute, and more preferably, plus-or-minus one-fourth arc-minute. Some further deviation may occur during the molding operation, though preferably there is no more than a two or three arc-minute change, and more preferably, no more than one or two arc-minutes change, during molding.

The invention may be practiced with cube-corner retroreflective elements of a wide range of sizes. Larger sizes are of advantage when it is desired to minimize the effects of diffraction. Smaller sizes can be desirable to achieve a thin flexible sheeting. For the latter use, the cube-corner retroreflective elements are generally defined by grooves spaced no more than about one millimeter apart, and preferably, no more than about one-half millimeter apart, in which cases there will be hundreds of cube-corner retroreflective elements per square centimeter. To achieve precision in the shaping of a divergence or observation profile of retroreflected light from an article of the invention, cube-corner elements are preferably selected so that the retroreflected beam or beams of light from that element have a narrow divergence profile, such as can be achieved by avoiding imperfections in the face angles, and by using cube-corner elements of sufficient size.

As indicated above, an advantage of the invention is that when cutting a V-groove, all of the faces produced along each side of the groove have precisely the same angle. Also, this same face angle can be obtained quite precisely each time that the cutting tool is indexed over to repeat the same groove. This precision in the shaping of identical cube-corner retroreflective elements allows for a precise overlapping of the retroreflective light patterns from each cube-corner retroreflective element and, therefore, minimizes the divergence or discrepancy between cube-corner elements having the same optical design. Such interactive precision contributes to the controlled use of light so that light is directed only at intended angles.

Preferably, the grooves forming the configured surface of a retroreflective article of the invention extend continuously across a multitude of sub-arrays, with the many individual sub-arrays being created by the repeating pattern of the grooves. Such continuous grooves contrast with the formation of individual pins, each having the shape of an individual cube-corner retroreflective element, such as is used with large cube-corner retroreflective elements (see Heenan, U.S. Pat. No. 3,833,285), and also contrast with the procedure taught in Van Arnam, U.S. Pat. No. 4,243,618, in which an array comprising zones of differently oriented cube-corner retroreflective elements are provided by grooving a planar surface formed by a bundle of pins, then loosening the bundle, rotating the pins, and reassembling the bundle. The use of continuous grooves is preferred because they are more convenient and less expensive to cut, and avoid disruption and loss of reflectivity at boundaries between zones. A repeating pattern of continuous grooving as used in the invention can create sub-arrays without manufacture of separate pins. However, the present invention may be practiced with retroreflective articles prepared using tooling prepared by grooving a planar surface formed from a bundle of individual pins, and then rotating the pins to vary the orientation of the cube-corner retroreflective elements inscribed into the pins. Generally, the portion of the planar surface provided by a pin is at least as large as the area of a sub-array.

As may be seen from the representative patterns of FIGS. 3 and 4, one convenient way to change the angle of a groove side is to rotate 180° a V-shaped tool such as a diamond-pointed tool being used to cut the master from which an article of the invention is ultimately prepared. In effect, many grooves in the sets of grooves shown in FIGS. 3 and 4 have cross-sectional shapes that are simply rotated 180° from one another. Also, the variation from orthogonality in a groove may be obtained by tilting or offsetting a V-shaped tool, such as a diamond-pointed tool, used to form a groove. The same tool may also be used to cut more than one set of grooves.

As discussed above, each distinctively shaped cube-corner retroreflective element redirects light incident on that element in a distinctively shaped pattern or field, i.e., a pattern or field that is shaped differently from the patterns or fields produced by cube-corner retroreflective elements of a different shape. The field produced by a particular shape of element can be determined empirically, or can be determined through computer projections by use of a combination of geometric optics (i.e., ray tracing) and diffraction optics. Geometric optics, or ray tracing, has generally been used to predict the path of beams of retroreflected light leaving a non-orthogonal cube-corner retroreflective element, and correspondingly, to predict the location of a spot on a planar surface where the beam is intercepted. However, such ray tracing is not sufficient to fully characterize the magnitude and contour of the light distribution field from non-orthogonal cube-corner retroreflective elements in which the faces are non-orthogonal by a few arc-minutes. This is true because tilting one or more faces of a cube-corner retroreflective element out of its orthogonal-producing angle changes the element from one in which the six sub-apertures within the exit aperture of the element function in effect as a single optical aperture to one in which the six sub-apertures will function independently and have a particular phase relationship with respect to one another. The relationship of phase between the sub-apertures has a strong influence on the divergence profile. The effect may be calculated by a method such as Fourier analysis which considers both the amplitudes and phase relationships within the exit aperture; see CSC/TM-77/6054, *Description of the Cube Corner Retroreflector Modeling Programs (Solid and Hollow) For Calculating Far-Field Diffraction Patterns*, J. G. Kirk, February 1977, prepared for National Aeronautics and Space Administration, Goddard Space Flight Center, Contract NAS 5-11999, Task Assignment 842.

The sheet material shown in FIGS. 1 and 2 is of the type taught in U.S. Pat. No. 4,588,258 (which is incorporated herein by reference), with the optical axes of the cube-corner retroreflective elements being tilted away from perpendicularity with the front face of the sheet material. This tilting is different from the present invention's slight tilting of individual groove sides away from orthogonal-producing angles: a whole cube-corner element is tilted by the teachings of U.S Pat. No. 4,588,258, with the faces of the element maintaining their relative position to one another during the tilting; the dihedral angles within the element can continue to be 90° after the tilting of U.S. Pat. No. 4,588,258. In the present invention at least one or more groove sides in one or more sets of grooves is tilted out of the position that produces all 90° dihedral angles in the cube-corner element so as to produce non-orthogonal cube-corner retroreflective elements. As shown in FIG. 1, in a sheet material of the type taught in U.S. Pat. No. 4,588,258, the cube-corner retroreflective elements are arranged in pairs, each element of the pair being rotated 180° from the other element. As also shown in FIG. 1, the base plane of a cube-corner retroreflective element in sheet material as taught in U.S. Pat. No. 4,588,258 (which corresponds to the exit aperture of the element) is an isosceles triangle; representative included angles of such a triangle are 70°, 55°, and 55°.

The invention is also useful with retroreflective articles in which the cube-corner retroreflective elements are not tilted in the manner of U.S. Pat. No. 4,588,258, but instead continue to have their optical axes perpendicular with the front face of the sheet material. As to such a cube-corner retroreflective element, the base plane is an equilateral triangle.

Although the retroreflective article of the invention illustrated in FIGS. 1 and 2 is sheet material, and preferably is a flexible sheet material such as may be wound in a storage roll, the invention is also useful with other retroreflective articles, such as rigid plates, or reflector bodies such as used for the reflectors mounted on the rear of vehicles, or raised pavement markers such as are adhered on a roadway surface to delineate lanes of travel and which have cube-corner retroreflective elements molded on side faces of the markers to reflect light from the headlamps of vehicles traveling on the roadway.

Retroreflective articles of the invention are generally manufactured using tooling generated by first scribing a plate (see Stamm, U.S. Pat. No. 3,712,706, column 17, line 25 through column 21, line 44) to form a pattern of grooves as shown in FIGS. 3 and 4. The grooved plate is then used as a master, e.g., in electroforming processes, to form a mold from which an article of the invention can be cast, embossed, or otherwise molded. A variety of transparent materials, generally organic polymeric materials, may be used to form the article, such as thermoplastic acrylate-based polymers, especially impact-modified ersions thereof, polycarbonates, vinyl polymers, cellulose acetate butyrates, and polyurethanes or reactive polymer systems such as taught in Martens, U.S. Pat. No. 4,576,850, or Barber, U.S. Pat. No. 4,582,885.

The invention will be further illustrated by the following examples.

EXAMPLE 1

This example illustrates a procedure by which a desired divergence profile for a retroreflective article of the invention can be determined and is discussed using FIGS. 6-9. FIG. 6A schematically represents the relative positions in a vertical plane of a vehicle 20 driving on a roadway, a traffic control sign 21 mounted above the roadway in one possible representative position, and the eyes 22 of the driver of the vehicle. The vertical component of the entrance angle (i.e., the projection of the entrance angle onto a vertical plane) for light traveling on illumination axis 23 from the headlamps of the vehicle ($V\phi$) and the vertical component of the observation angle for the driver ($V\alpha$) are shown, as are the distance D between the headlamps of the vehicle and the sign, the distance d between the headlamps and the driver's eyes, the distance H between the headlamps and the center of the sign, and the distance h between the headlamps and the driver's eyes. The vertical component of the observation angle $V\alpha$, is given by the following formula:

$$V\alpha = \arctan[(D+d)/(H-h)] - (\arctan D/H).$$

Figure 6A:
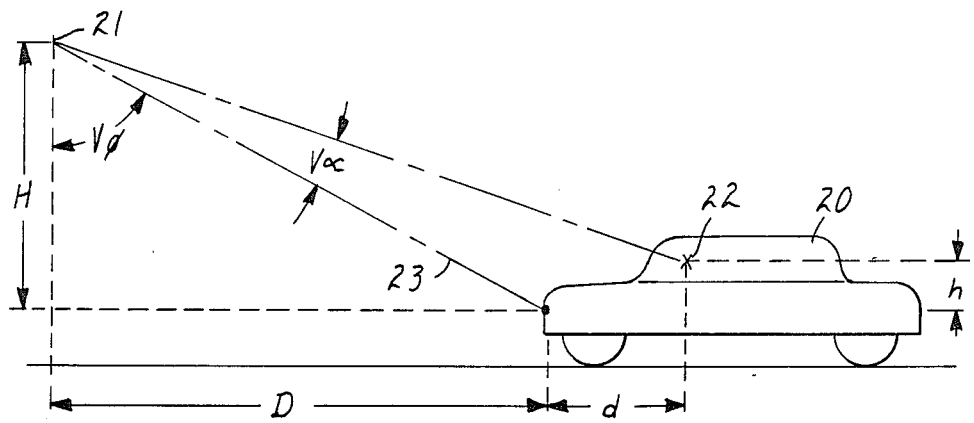
Figure 6B:
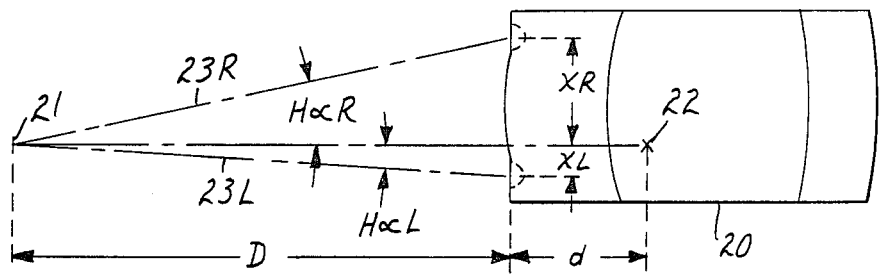

FIG. 6B shows the relative locations in a horizontal plane of the vehicle, driver and sign, and shows the horizontal component of the observation angle for the right headlamp of the vehicle ($H\alpha L$) and the horizontal component for the left headlamp. ($H\alpha L$). The distance between the driver and the right and left headlamps is represented respectively by xR and xL. The values for the horizontal components of observation angle are given by the following equations, which are simplified by disregarding the displacement of the driver from the reference axis of the sign:

$$H\alpha R = \arctan(xR/D)$$

$$H\alpha L = \arctan(xL/D).$$

Using the above equations, and assuming a value of 19.4 feet for H, 8.5 feet for d, 2.5 feet for h, 2.75 feet for xR and 0.75 foot for xL, the values for $V\alpha$ and $H\alpha R$ and $H\alpha L$ for various distances D are shown in the following table:

TABLE II

| | H = 19.4′ (21.5-2.1) | $X_R$ = 2.75′ | |
| | h = 2.5′ | $X_L$ = .75′ | |
| | d = 8.5′ | | |
| D (Feet) | αV Degrees | αR Degrees | αL Degrees |
|---|---|---|---|
| 2,000 | .074 | .079 | .021 |
| 1,500 | .099 | .105 | .029 |
| 1,000 | .151 | .158 | .043 |
| 500 | .318 | .315 | .086 |
| 250 | .697 | .630 | .172 |

TABLE II-continued

| | H = 19.4′ (21.5-2.1) | $X_R$ = 2.75′ | |
| | h = 2.5′ | $X_L$ = .75′ | |
| | d = 8.5′ | | |
| D (Feet) | αV Degrees | αR Degrees | αL Degrees |
|---|---|---|---|
| 125 | 1.607 | 1.260 | .344 |

Figure 7:
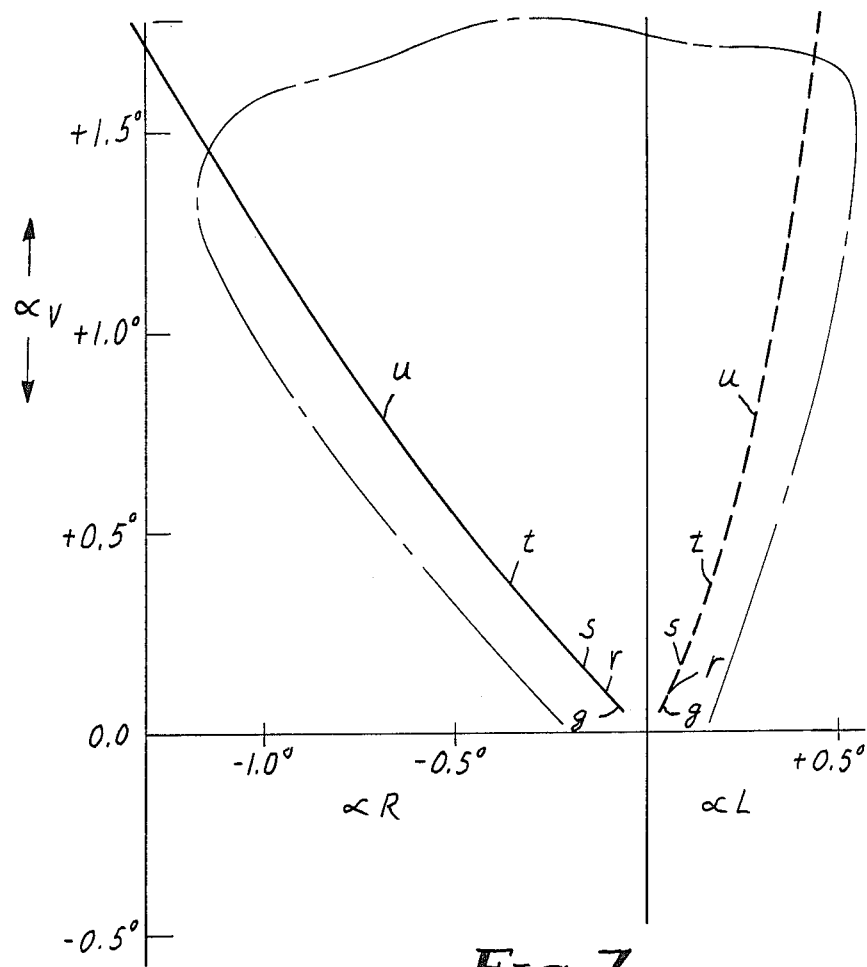
Figure 8:
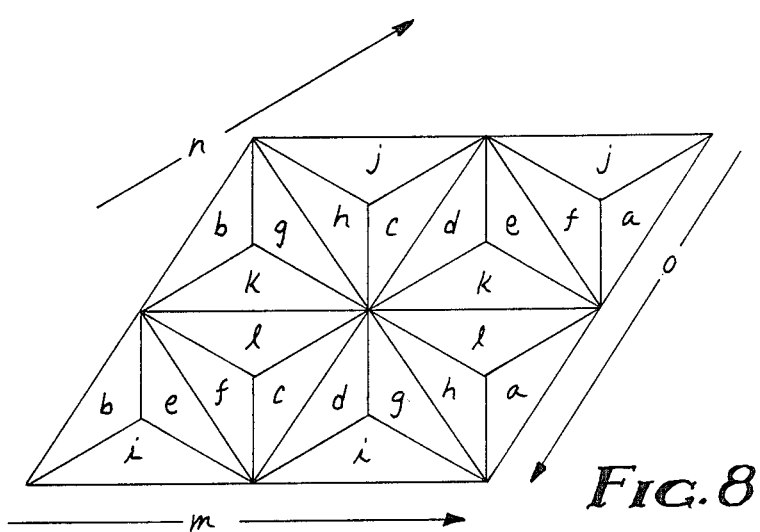

FIG. 7 is a plot of the values listed in Table II, with the horizontal components of observation angle for the right headlamp being plotted on the abscissa to the left of the origin, the horizontal component of observation angle for the left headlamp being plotted on the abscissa to the right of the origin, and the vertical component of observation angle being plotted on the ordinate. The solid-line plot in the upper left hand quadrant shows the different observation angles of the driver for retroreflected light from the right headlamp at different distances D, and therefore represents the desired divergence profile for right-headlamp light retroreflected by the sign. Correspondingly, the dashedline plot in the upper right hand quadrant represents the desired divergence profile for left-headlamp light retroreflected by the sign. On both curves, the points q, r, s, t, and u, represent, respectively, the distances 2,000 feet, 1,500 feet, 1,000 feet, 500 feet, and 250 feet.

FIG. 7 thus describes an ideal divergence or observation profile for light retroreflected by the sign for the situation shown in FIG. 6. Because the ideal conditions will not occur in reality (e.g., a vehicle will be located in slightly different positions of a lane of travel, drivers will be at different heights, etc.), a broader profile such as that defined by the broken-line shape in FIG. 7 is actually more desired. Also, the broken-line profile includes an area between the solid-line and dashed-line plots, because some vehicles such as motorcycles have a single headlamp, and because in some vehicles such as buses or trucks the driver is higher above the headlights than assumed above.

A profile as shown in broken lines in FIG. 7 may be obtained with a retroreflective article of the invention in which the sub-arrays are eight-cube-corner arrays; i.e., there are eight distinctively shaped cube-corners elements in the array. A representative array of this type is described in schematic manner in FIG. 8 and the following Table III, which list the amount by which the face angles of the individual cube-corner elements deviate from orthogonal-producing (in this case, in which three sets of parallel grooves intersect one another at 60° and the base plane of the individual cube-corner retroreflective elements is therefore an equilateral triangle, orthogonality would be produced if all groove side angles were at 35.264°). Faces that are at the same groove side angle or face angle are identified by identical letters.

TABLE III

| a = −0.058° | g = −0.145° |
|---|---|
| b = −0.145° | h = −0.058° |
| c = −0.058° | i = +0.145° |
| d = −0.291° | j = −0.058° |
| e = −0.291° | K = +0.145° |
| f = −0.058° | l = +0.058° |

Figure 9:
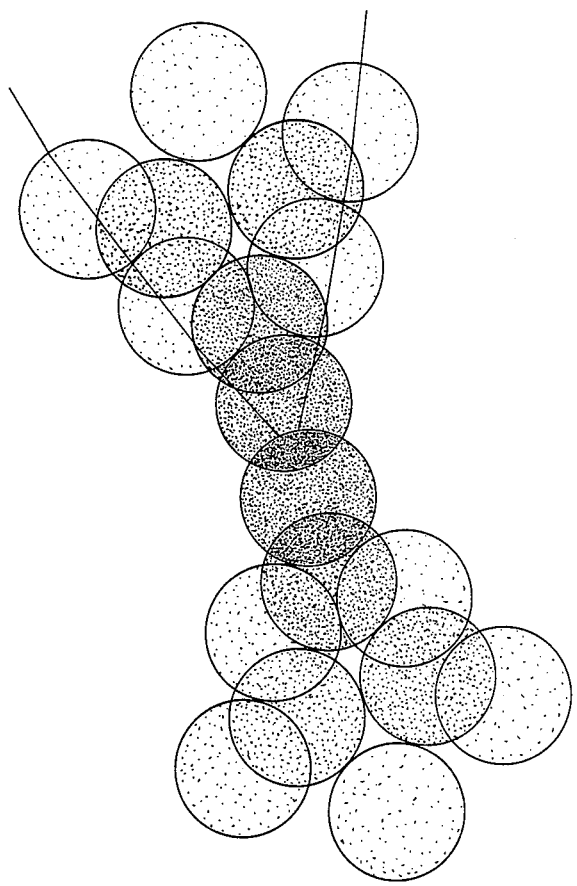

When light is beamed along the reference axis at sheet material of the invention having angles as described above, the retroreflected light will have a profile as generally described by the broken-line of FIG. 7; i.e., if the retroreflected light is intercepted by a plane surface perpendicular to the reference axis, it will light up the plane surface in a pattern outlined by the broken line. This is illustrated in FIG. 9, which shows the pattern of spots or beams of light as distributed from the different faces of the cube-corner elements of the array shown in FIG. 8. It should be noted that in moving cube-corner element faces away from orthogonal-producing angles to form a light beam having the broken-line profile of FIG. 7, an equal beam rotated 180° from the desired beam will also be created, meaning that the complete retroreflection from the article will have the shape or divergence profile shown in FIG. 9, which we have characterized as a "dogbone" shape. The bottom half of the dogbone may be effectively disregarded, since no drivers will generally ever be in position to see that part of the pattern.

It should be noted that the retroreflective article need not, and often desirably does not, distribute light uniformly within the profile. For example, since the area within the profile around the point q in FIG. 7 represents the light seen when a driver is at a large distance (2,000 feet), and since the intensity of light striking a sign from headlamps spaced at that distance is less than the intensity of light reaching the sign from closer distances, the article of the example directs a greater proportion of the retroreflected light into that portion of the profile. This is illustrated in FIG. 9 by use of heavier stippling for those circles where several faces of cube-corner elements direct beams of light. The spots are schematic in that circles are used to represent the beam from a face; the size of the circle is chosen to represent the bulk of light within the bell-shaped distribution of light in each beam.

EXAMPLE 2

This example illustrates the improvement in rotational symmetry that the invention makes possible in the pattern of light retroreflected from a cube-corner retroreflective article. For comparison purposes, a polycarbonate sheeting like that described in Hoopman, U.S. Pat. No. 4,588,258, i.e., with the optical axes of the cube-corner retroreflective elements tilted as taught in that patent to increase entrance angularity, was molded from a nickel mold made by electroforming processes from a grooved master. All of the cube-corner elements in the sheeting were orthogonal and of the same shape. Specifically, the angles of the grooves were targeted to be 88.887°, 60.640°, and 60.640° (with groove side angles equal to one-half the groove angles). The base plane for the sheeting had included angles of 70°, 55°, and 55°, and the stated angles are the angles that produce orthogonality with such base triangles. The spacing between the 88.887° grooves was 0.013948 inch, and the spacing between the 60.640° grooves was 0.016 inch.

Retroreflective sheeting of the invention exactly like the comparative sheeting was prepared, except that groove side angles wer varied from the orthogonalproducing angles of the comparative sheeting in a grooving pattern like that shown in FIG. 3. The angles a–f were targeted to differ from orthogonal-producing angles by the following amounts in arc-minutes:

a= +2.3
b= −5
c= +2.3
d= +2.3
e= +2.3
f= −5.

Table IV below lists the maximum and minimum retroreflective intensities measured both on reflective sheeting of the example and the comparative sheeting for different presentation angles and different observation angles. Also listed are the differences between the maximum and minimum intensities and the percentage that the difference bears with respect to the maximum intensity.

TABLE IV

| Observation Angle (Degree) | Retroreflective Intensity at Different Presentation Angles | | | | Ratio of Delta to Maximum (%) |
|---|---|---|---|---|---|
| | Min. | Max. | Avg. | Delta | |
| COMPARATIVE SHEETING | | | | | |
| 0.1 | 2051 | 3215 | 2565 | 1164 | 36 |
| 0.2 | 1787 | 3726 | 2575 | 1939 | 52 |
| 0.3 | 1249 | 3065 | 2003 | 1816 | 59 |
| 0.4 | 390 | 1543 | 1056 | 1153 | 75 |
| 0.5 | 178 | 863 | 463 | 685 | 79 |
| 0.6 | 98 | 425 | 216 | 327 | 77 |
| 0.7 | 42 | 239 | 124 | 197 | 86 |
| 0.8 | 28 | 176 | 86 | 148 | 84 |
| 0.9 | 24 | 127 | 61 | 103 | 80 |
| 1.0 | 19 | 88 | 46 | 69 | 78 |
| SHEETING OF THE INVENTION | | | | | |
| 0.1 | 1829 | 2225 | 2043 | 396 | 18 |
| 0.2 | 1644 | 2033 | 1791 | 389 | 19 |
| 0.3 | 1234 | 1746 | 1468 | 512 | 29 |
| 0.4 | 678 | 1279 | 975 | 601 | 47 |
| 0.5 | 411 | 723 | 544 | 312 | 43 |
| 0.6 | 204 | 407 | 276 | 203 | 50 |
| 0.7 | 104 | 204 | 144 | 100 | 49 |
| 0.8 | 61 | 120 | 89 | 59 | 49 |
| 0.9 | 37 | 89 | 63 | 52 | 58 |
| 1.0 | 27 | 70 | 46 | 43 | 61 |

As will be seen, the variation in retroreflective intensity at different presentation angles is greatly reduced for sheeting of the invention.

Figure 10:
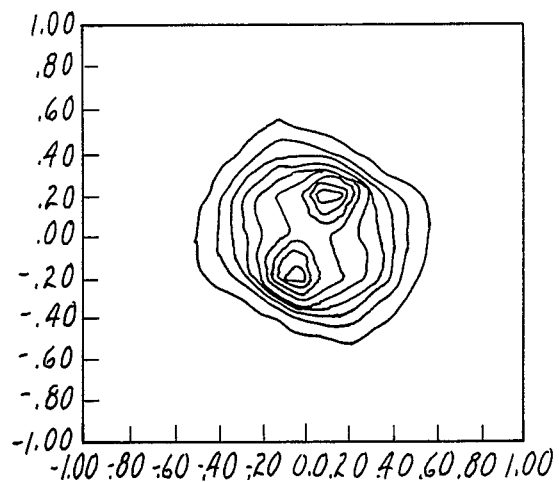
Figure 11:
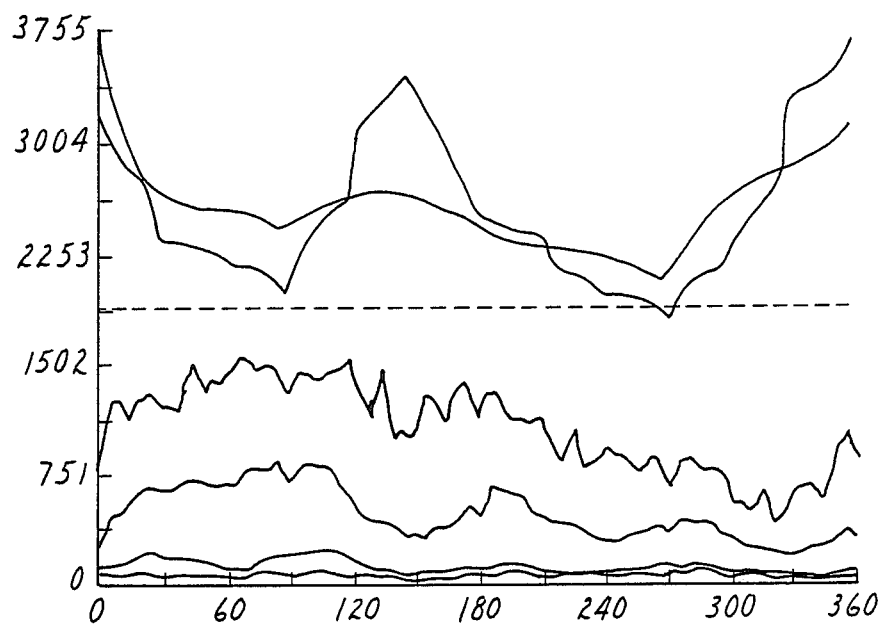
Figure 12:
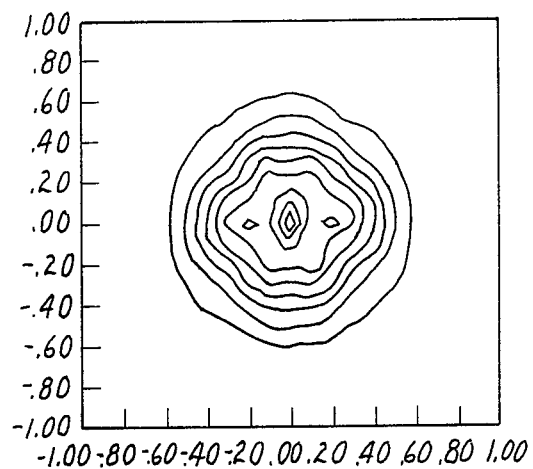
Figure 13:
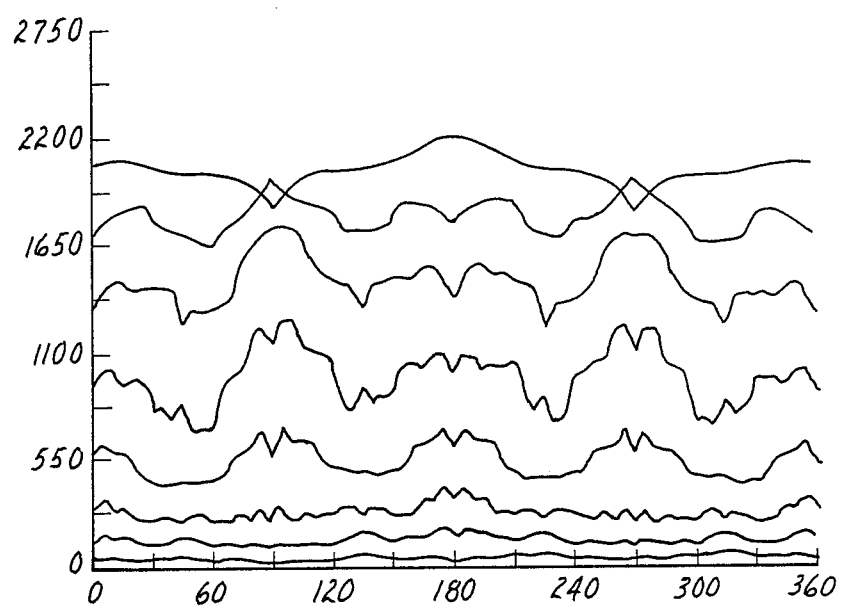

The differences in retroreflective brightness are graphically illustrated in FIGS. 10–13, which show respectively contours of iso-intensity (FIGS. 10 and 12) and a radial plot of divergence (FIGS. 11 and 13), FIGS. 10 and 11 show results for the comparative sheeting and FIGS. 12 and 13 show results for the sheeting of the example.

The advantages of this invention can also be obtained with smaller cube-corner elements than those used in this Example 2. For example, when the spacing between grooves of Example 2 is decreased by a factor of 2 (i.e., the spacing is ½ the previous spacing), and the amounts by which the individual angles in the repeating pattern deviate from orthogonality is increased by a factor of 2, we have maintained the same relative light patterns and symmetry of those reported in Example 2; and such sheeting has a broader divergence profile, i.e., can be seen at larger observation angles, though brightness at smaller observation angles is reduced somewhat. In general, some articles of special interest use grooving where the spacing is 1/p that of Example 2 and the angles deviate from orthogonal-producing by p times the amounts used in Example 2, with p preferably being between 2 and 2.67.

INTRODUCTION TO EXAMPLES 3 AND 4

The next two examples illustrate the benefits the invention offers with respect to another problem with cube-corner retroreflective articles, namely their sensitivity to loss of retroreflective brightness upon dimensional changes of the article. Cube-corner retroreflective elements require a precise configuration to be effective, and slight changes in shape, e.g., during the daily temperature cycling experienced in a signboard mounted alongside a roadway or during the cooling of a newly molded cube-corner retroreflective article, can greatly change the intensity of retroreflection from the article. In preferred articles of the invention, at least one of the sets of grooves includes at least one groove side angle that exceeds the angle required for orthogonality of the cube-corner elements and at least one groove side angle that is less than the angle required for orthogonality. Articles with such a pattern of grooves have been found to be less susceptible to a change of retroreflective properties through dimensional changes of the article. Apparently, a change in dimension of the retroreflective article tends to bring at least one groove side angle nearer to that required for orthogonality to thereby compensate for any loss of orthogonality of other groove side angles.

EXAMPLE 3

Demonstration of Improved Error Tolerance (or more stable response to changes in manufacturing embossing temperature)

Two nickel molds made by electroforming processes from a grooved master were used to emboss plastic films at two different embossing temperatures. Different embossing temperatures have been noted to produce sheet materials of different reflective brightnesses, apparently because the shape of the cube-corner retroreflective elements is affected by the different temperatures.

Mold No. 1 was for comparative purposes and contained an array of cube-corner retroreflective elements all nominally of the same geometry (like that described in U.S. Pat. No. 4,588,258), with groove angles of 88.792°, 60.585°, and 60.540°, groove side angles half those values, and a spacing between grooves of 0.016 inch for the 88.792° grooves and 0.013948 inch for the 60.585° grooves. Mold No. 2 was designed to make sheet material of the invention and contained an array of cube corner retroreflective elements identical in size and basic geometry to those of Mold No. 1, but which were defined by intersecting sets of grooves having repeating patterns generally like those of FIG. 3; the patterns were identical to those of FIG. 3 except that in the "m" set of grooves the "a" and "b" angles were replaced by "g" and "h"; Table V below gives deviations from orthogonal-producing angles in arc-minutes for each of the groove side angles.

TABLE V

| a = −4.6 | e = −5.3 |
|---|---|
| b = +2.6 | f = +2.0 |
| c = +2.0 | g = −3.8 |
| d = +2.0 | h = +3.4 |

Mold No. 1 had a pattern area of 11.25 inch × × 11 inch and a thickness of 0.0249 inch; Mold No. 2 had a pattern area of 11.5 inch and 11.5 inch and a thickness of 0.0237 inch.

The plastic film used was 10.5-inch × 10.5-inch × 0.030-inch acrylic film (Plexiglas DR resin made by Rohm and Haas Corporation). Prior to molding, the plastic film was placed on the mold pattern and backed successively by an 11 inch × 11 inch × 0.004 inch polyester film, a 12.5 inch × 13 inch × 0.051 inch chrome plate, and a 16 inch × 0.034 inch cardboard sheet. The mold was backed by a second 12.5 inch × 13 inch × 0.051 inch chrome plate. The resultant sandwich was then placed in an oil-heated platen compression press with the cardboard against the upper platen. The press was closed to a force of 10,000 pounds and heated to the desired embossing temperature. Once this temperature was reached, the force was increased to 100,000 pounds and the temperature maintained for 20 seconds. After this period, the sandwich was cooled under the high force until the platen temperature reached 160° F. At this point, the press was opened and the sandwich removed. When the surface temperature of the bottom chrome plate reached 110° F., the sandwich was opened and the embossed cube-corner retroreflective sheet material removed from the mold. Each mold was used to emboss sheet material at temperatures of 300° F. and 380° F., thus yielding four sheet materials.

The reflective brightness of each sheet material in a one-inch-diameter area was measured with a retroluminometer similar to that described in Defensive Publication T987,003 at an entrance angle of −4° and constant rotation angle over a range of presentation angles from 15°–360° and observation angles of 0.2° and 0.5°. The measured brightnesses in candelas/lux/square meter versus presentation angle (in degrees) are shown in Table VI.

TABLE VI

| | 380° EMBOSSING TEMPERATURE | | 300° EMBOSSING TEMPERATURE | |
|---|---|---|---|---|
| Presentation Angle | Observation Angle of 0.2° (cd/lx/m²) | Observation Angle of 0.5° (cd/lx/m²) | Observation Angle of 0.2° (cd/lx/m²) | Observation Angle of 0.5° (cd/lx/m²) |
| Retroreflective Brightnesses At 0.2° And 0.5° Observation Angles For Different Sheetings Embossed On Mold No. 1 At Different Embossing Temperatures | | | | |
| 15 | 1325 | 237 | 1871 | 327 |
| 30 | 1376 | 151 | 1673 | 166 |
| 45 | 1217 | 183 | 1628 | 130 |
| 60 | 1583 | 186 | 2085 | 171 |
| 75 | 2724 | 317 | 3061 | 393 |
| 98 | 3235 | 666 | 3351 | 681 |
| 105 | 2596 | 545 | 2747 | 545 |
| 120 | 2018 | 507 | 2442 | 288 |
| 135 | 2564 | 550 | 3089 | 429 |
| 150 | 2648 | 544 | 3253 | 514 |
| 165 | 1773 | 616 | 2563 | 455 |
| 180 | 1377 | 398 | 2188 | 316 |
| 195 | 1287 | 242 | 1888 | 298 |
| 210 | 1397 | 158 | 1717 | 190 |
| 225 | 1267 | 172 | 1569 | 150 |
| 240 | 1382 | 162 | 1745 | 132 |
| 255 | 2386 | 237 | 2649 | 311 |
| 270 | 3269 | 602 | 3307 | 649 |
| 285 | 2931 | 589 | 2926 | 591 |
| 300 | 2081 | 480 | 2443 | 306 |
| 315 | 2348 | 624 | 2929 | 496 |
| 330 | 2740 | 567 | 3291 | 457 |
| 345 | 2060 | 678 | 2826 | 581 |
| 360 | 1385 | 408 | 2291 | 348 |
| Retroreflective Brightnesses At 0.2° And 0.5° Observation Angles For Different Sheetings Embossed On Mold No. 2 At Different Embossing Temperatures | | | | |
| 15 | 1969 | 568 | 1922 | 577 |
| 30 | 1683 | 487 | 1633 | 501 |
| 45 | 1922 | 428 | 1844 | 422 |
| 60 | 2082 | 522 | 1974 | 482 |
| 75 | 1891 | 614 | 1769 | 604 |
| 90 | 1887 | 537 | 1737 | 545 |
| 105 | 2088 | 519 | 1957 | 526 |
| 120 | 2006 | 351 | 1967 | 384 |
| 135 | 1653 | 402 | 1596 | 414 |
| 150 | 1770 | 449 | 1663 | 488 |
| 165 | 2249 | 490 | 2145 | 521 |
| 180 | 2382 | 544 | 2352 | 576 |

TABLE VI-continued

|  | 380° EMBOSSING TEMPERATURE | | 300° EMBOSSING TEMPERATURE | |
|---|---|---|---|---|
| Presentation Angle | Observation Angle of 0.2° (cd/lx/m²) | Observation Angle of 0.5° (cd/lx/m²) | Observation Angle of 0.2° (cd/lx/m²) | Observation Angle of 0.5° (cd/lx/m²) |
| 195 | 2029 | 528 | 2007 | 539 |
| 210 | 1645 | 476 | 1619 | 499 |
| 225 | 1783 | 432 | 1725 | 428 |
| 240 | 2089 | 466 | 1991 | 439 |
| 255 | 1952 | 586 | 1828 | 566 |
| 270 | 1810 | 507 | 1678 | 518 |
| 285 | 2004 | 525 | 1856 | 527 |
| 300 | 2087 | 380 | 2023 | 414 |
| 315 | 1797 | 399 | 1737 | 388 |
| 330 | 1738 | 463 | 1635 | 499 |
| 345 | 2154 | 579 | 2020 | 600 |
| 360 | 2382 | 590 | 2334 | 617 |

The absolute percentage brightness difference between the sheet materials prepared at the two different embossing temperatures of 300° F. and 380° F. was then calculated for each measured presentation angle for each mold at each observation angle and is reported in Table VII.

TABLE VII

Percentage Differences In Retroreflective Brightnesses Between Sheetings Embossed At Different Temperatures For Mold No. 1 and Mold No. 2

|  | Mold No. 1 | | Mold No. 2 | |
|---|---|---|---|---|
| Presentation Angle (Degrees) | Observation Angle of 0.2° (Percent) | Observation Angle of 0.5° (Percent) | Observation Angle of 0.2° (Percent) | Observation Angle of 0.5° (Percent) |
| 15 | 29.2 | 27.5 | 2.4 | 1.6 |
| 30 | 17.8 | 9.0 | 3.1 | 2.8 |
| 45 | 25.2 | 41.9 | 4.2 | 1.4 |
| 60 | 24.1 | 8.8 | 5.5 | 8.3 |
| 75 | 11.0 | 19.3 | 6.9 | 1.6 |
| 90 | 3.5 | 2.2 | 8.6 | 1.5 |
| 105 | 5.5 | 0.0 | 6.7 | 1.3 |
| 120 | 17.4 | 76.0 | 2.0 | 8.6 |
| 135 | 17.0 | 28.2 | 3.6 | 2.9 |
| 150 | 18.6 | 5.8 | 6.4 | 8.0 |
| 165 | 30.8 | 35.4 | 4.8 | 6.0 |
| 180 | 37.1 | 25.9 | 1.3 | 5.6 |
| 195 | 31.8 | 18.8 | 1.1 | 2.0 |
| 210 | 18.6 | 16.8 | 1.6 | 4.6 |
| 225 | 19.2 | 14.7 | 3.4 | 0.9 |
| 240 | 20.8 | 22.7 | 4.9 | 6.2 |
| 255 | 9.9 | 23.8 | 6.8 | 3.5 |
| 270 | 1.1 | 7.2 | 7.9 | 2.1 |
| 285 | 0.2 | 0.3 | 8.0 | 0.4 |
| 300 | 14.8 | 56.9 | 3.2 | 8.2 |
| 315 | 19.8 | 25.8 | 3.4 | 2.8 |
| 330 | 16.7 | 24.1 | 6.3 | 7.2 |
| 345 | 29.2 | 16.7 | 6.6 | 3.5 |
| 360 | 39.5 | 17.2 | 2.1 | 4.4 |

From the above data, the average change, standard deviation of change, and 95% confidence limit for the average (with a 5 percent risk that the true population average falls outside of these limits) were calculated, and the results are shown in Table VIII. Also included in Table VIII are results for an additional two embossings made at each of the four mold/emboss temperature combinations using the same process as noted above. These embossings were measured as above and the average of the average absolute percent brightness changes between the 300° and 380° temperature pressings for the three embossings was calculated, and the results are summarized in Table VIII under the heading Repeated Tests.

TABLE VIII

Brightness Change Between 300° and 380° Embossing Temperatures

| Observation Angle | | Mold No. 1 | Mold No. 2 |
|---|---|---|---|
| 0.2° | Avg. % Change in Brightness | 19.1 | 4.6 |
|  | Standard Deviation | (10.6) | (2.3) |
|  | 95% Confidence Limits | 14.5–23.7 | 3.6–5.6 |
| 0.5° | Avg. % Change in Brightness | 21.9 | 4.0 |
|  | Standard Deviation | (17.6) | (2.7) |
|  | 95% Confidence Limits | 14.3–29.5 | 2.8–5.2 |
|  | Repeated Tests | | |
| 0.2° | Avg. % Change in Brightness | 15.5 | 3.1 |
|  | Standard Deviation | (3.12) | (1.72) |
|  | 95% Confidence Limits | 7.8–23.2 | 0–7.4 |
| 0.5° | Avg. % Change in Brightness | 18.4 | 3.1 |
|  | Standard Deviation | (4.54) | (1.47) |
|  | 95% Confidence Limits | 7.3–29.7 | 0–6.7 |

The results reported in Table VIII show that the average percentage change between the two embossing temperatures for Mold No. 2 (the sheet material of the invention) is statistically lower at both observation angles than the average change between the two embossing temperatures for the comparative Mold No. 1, thereby showing that a sheeting of the invention has greater stability than the comparative sheeting against errors that may occur during the embossing process.

EXAMPLE 4

Demonstration of Improved Error Tolerance (or more stable response to changes in dimensions of product during use)

In this example, two embossed plastic cube-corner sheet materials, one comparative and one of the invention, were stretched to determine the effect of dimensional change on product brightness. Plastic cube-corner sheet material or film products commonly undergo dimensional change during use. This change may typically be caused by product expansion or contraction as a result of temperature and humidity environmental changes or by deformation resulting from the bending of the product around a small radius device, such as a delineator pole. It is desirable that the product brightness not be significantly altered when such dimensional changes occur.

Both sheet materials were made of polycarbonate film (Lexan resin made by General Electric Corporation). The comparative sheet material was a 0.0125-inch-thick film containing a pattern of cube-corner elements all nominally of the same shape and having groove angles of 88.832°, 60,569°, and 60.530° (with groove side angles equal to one-half the groove angles) and groove spacings as stated in Example 2. The sheet material of the invention was a 0.015-inch-thick film containing a pattern of cube-corner elements like that described in Example 2.

A 4.8 inch × 1.25 inch strip was cut from each sheet material with the long direction parallel to the direction of the 88° grooves. One strip at a time was then elongated in incremental amounts and the strip brightness measured at each incremental deformation. The strip was placed under a retroluminometer as described in Defensive Publication T987,003, with the long axis of the strip perpendicular to the axis over which the entrance angle could be varied. Incremental lengths were measured with a micrometer and at each incremental elongation, the strip brightness was measured at an entrance angle of =4° and an observation angle of 0.2°. The measured data for both sheet materials is given in Table IX.

TABLE IX

Percentage Brightness Retained After Elongation

| Elongation (Mils) | Brightness (cd/lx/m²) | Percentage Of Original Brightness Retained (%) |
|---|---|---|
| Comparative Sheet Material Initial Brightness 1560 Candelas/Lux/Square Meter | | |
| 1 | 1408 | 90.2 |
| 2 | 1296 | 83.1 |
| 3 | 1172 | 75.1 |
| 5 | 1046 | 67.1 |
| 7 | 816 | 52.3 |
| 9 | 685 | 43.9 |
| 10 | 560 | 35.9 |
| 11 | 455 | 29.2 |
| 15 | 316 | 20.3 |
| 17 | 242 | 15.5 |
| 20 | 197 | 12.6 |
| Sheet Material of The Invention Initial Brightness 1600 Candelas/Lux/Square Meter | | |
| 1 | 1529 | 95.6 |
| 4 | 1353 | 84.6 |
| 6 | 1220 | 76.2 |
| 8 | 1075 | 67.2 |
| 11 | 984 | 61.5 |
| 12 | 878 | 54.9 |
| 14 | 787 | 49.2 |
| 15 | 715 | 44.7 |
| 17 | 625 | 39.1 |
| 20 | 535 | 33.4 |

Figure 14:
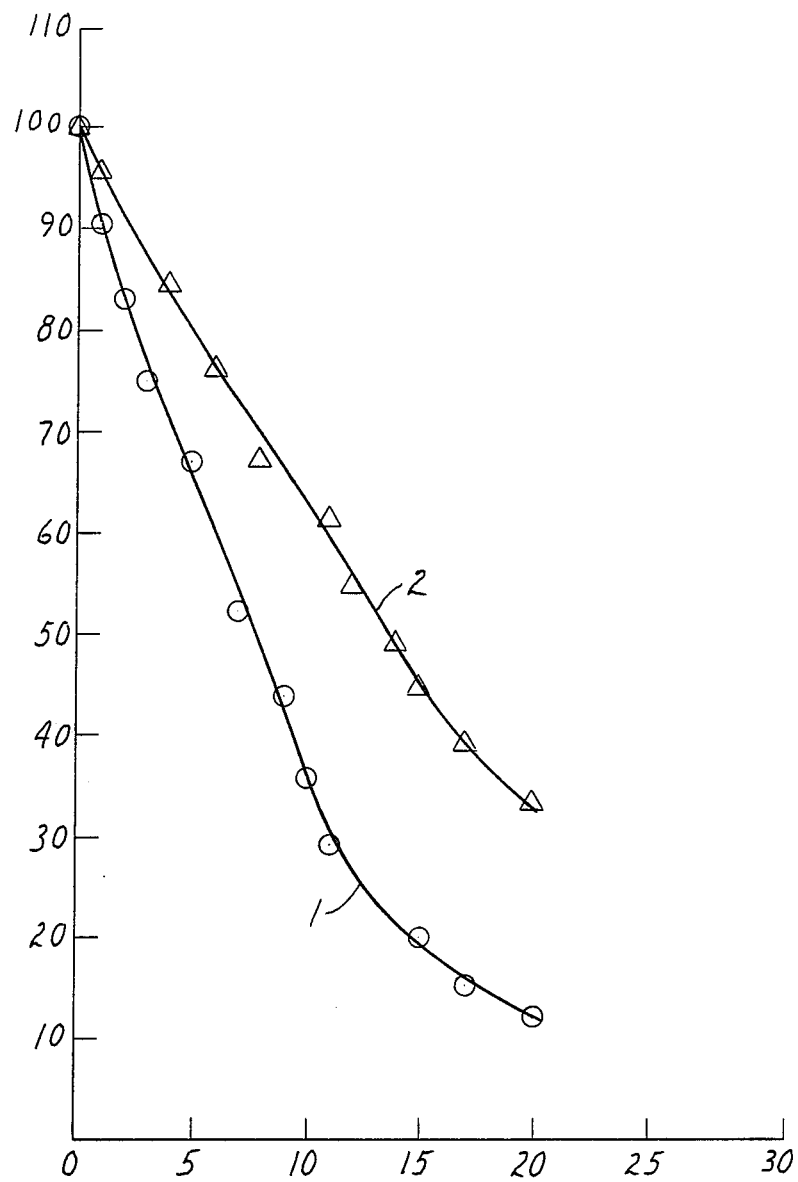

The resultant curves of brightness in candelas/lux/square meter (normalized to 100% for the initial brightness) versus elongation in mils (thousandths of an inch) for each sheet material are shown in FIG. 14, where curve 1 is for the comparative sheet material and curve 2 is for the sheet material of the invention. It will be noted that the change in brightness for sheet material of the invention is less than that for the comparative sheet material at equal elongation over the range tested. The results indicate that the brightness response of sheet material of the invention was less variant than that of conventional sheet material over the deformation range tested.

EXAMPLE 5

(Retroreflective Article That Provides Image Viewable in Space)

As previously indicated, when a plane surface such as a translucent screen is disposed in the path of a cone of light retroreflected from a retroreflective article of the invention, the divergence profile of the cone will appear on the screen. In some cases, the profile need not be projected on a surface to see the light contained within the profile. If the retroreflective article is larger than the field of view of the observer, the retroreflected light can form an image that will be seen without the aid of a translucent screen material and the image will appear to float in space.

Figure 16:
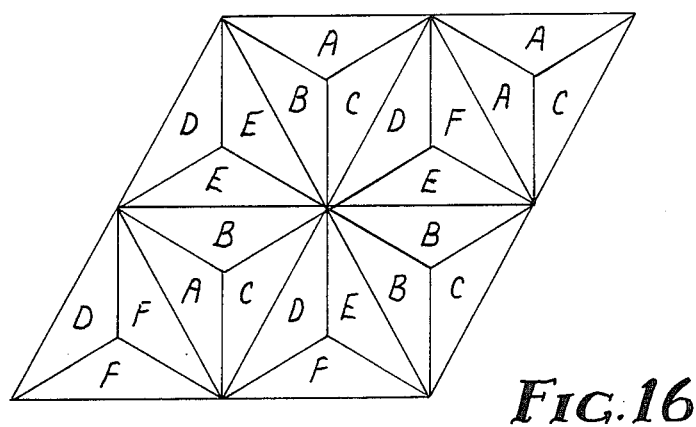
Figure 15A:
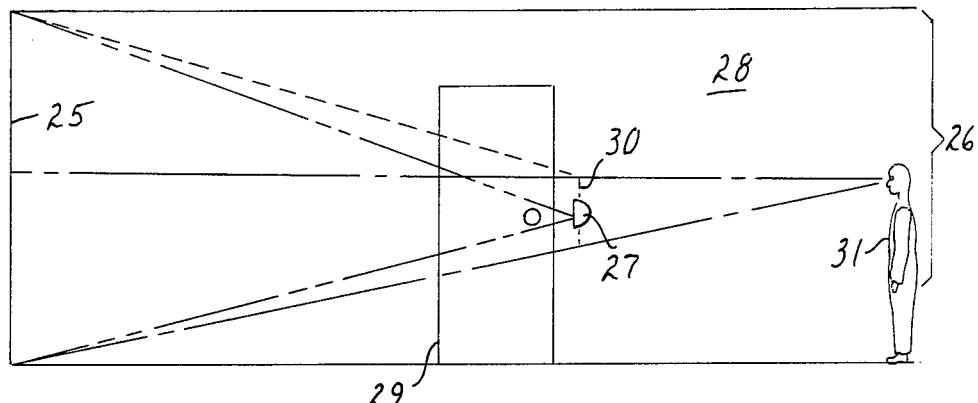
Figure 15B:
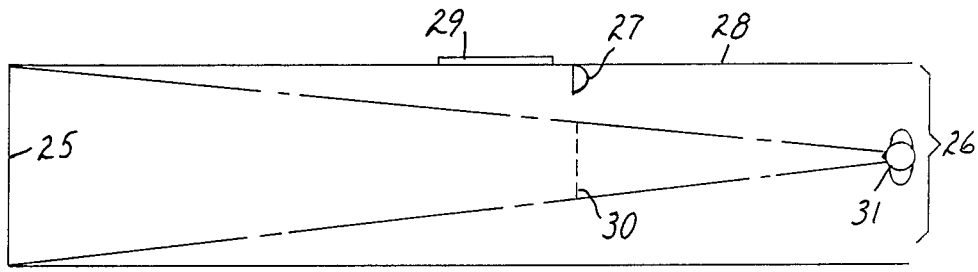
Figure 15C:
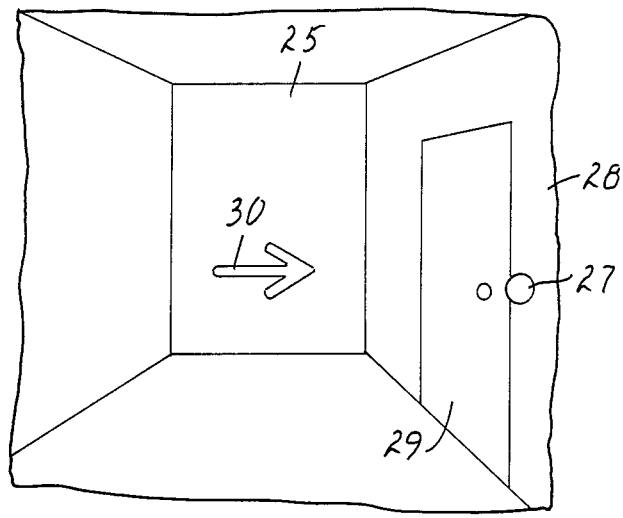

This aspect of the invention is illustrated in FIG. 15 where a retroreflective sheet material 25 is placed on a wall at the end of of a hallway 26. A lamp 27 is mounted on the wall 28 of the hallway next to an exit door 29 and floods the retroreflective sheet material 25 with light. The sheet material 25 is designed to generate an image of an arrow 30 pointing to the exit door 29, and the arrow 30 would appear to the observer 31 to be floating in space directly in front of the door. The pattern which provides such an arrow-shaped design is described in FIG. 16 and the following Table X, which gives the amount in arc-minutes by which each face angle deviates from the orthogonal-producing angle of 35.264°. Such a pattern will create two arrows rotated 180° apart, but the placement of the sheeting and light source will cause the second arrow to be located at a point occupied by the wall so that it is not noticeable to the observer.

TABLE X

| A = −22 | D = +24 |
|---|---|
| B = −43 | E = −36 |
| C = +25 | F = −21 |

Glossary of Terms

Groove Side Angle—The angle between the groove side and a plane extending parallel to the length of the groove and perpendicular to the plane defined by the bottom edges of the three intersecting sets of V-shaped grooves.

Reference Center—A point on or near a retroreflector which is designated to be the center of the device for the purpose of specifying its performance.

Illumination Axis—A line segment from the reference center to the center of the illumination source.

Observation Axis—A line segment from the reference center to the center of the light receptor or viewer.

Observation Angle—The angle between the illumination axis and the observation axis.

Reference Axis—A designated line segment from the reference center which is used to describe the angular position of the retroreflector, and which for most articles, including sheet material of the invention, is a line perpendicular to the front surface of the article.

Entrance Angle—The angle between the illumination axis and the reference axis.

Presentation Angle—The dihedral angle between the entrance plane (formed by the illumination axis and the reference axis) and the observation plane (formed by the illumination axis and the observation axis).

Datum Mark—A mark on the retroreflector that is used to indicate the orientation of the retroreflector with respect to rotation about the reference axis.

Observation Half Plane—The half-plane that originates on the illumination axis and which contains the observation axis.

First Axis—An axis through the reference center and perpendicular to the observation half-plane.

Second Axis—An axis through the reference center and perpendicular to both the first axis and the reference axis.

Rotation Angle—The dihedral angle from the half-plane originating on the reference axis and containing the positive part of the second axis (i.e., the part of the second axis that is in the observation half-plane) to the half-plane originating on the reference axis and containing the datum mark. Note that the rotation angle and presentation angle represent the same motion when the datum mark is aligned vertically with the reference center of the article, the receptor or viewer is aligned vertically with the illumination axis, and the illumination axis is perpendicular to the front surface of the article. Sheeting of the invention having improved rotational symmetry is of advantage since it minimizes the differences in divergence profile caused by mounting the sheeting in different angular orientations.

Viewing Angle—The angle between the observation axis and the reference axis.

Divergence Profile—A polar plot of retroreflective intensity as a function of observation angle on the r coordinate and presentation angle on the theta coordinate.

Observation Profile or Viewing Profile13 A polar plot similar to that for the divergence profile but which defines the range of viewing positions contemplated for a viewer with respect to a retroreflective article of the invention. Ideally, the divergence profile for a retroreflective article would match the contemplated observation or viewing profile.

The term divergence profile is generally used herein when emphasis is on the pattern of light as it leaves the reflector, while the term observation or viewing profile is generally used when emphasis is on the perception of light by a viewer.

What is claimed is:

1. Retroreflective article which carries on one side an array of cube-corner retroreflective elements, the three lateral reflecting faces of the elements being formed by three intersecting sets of parallel V-shaped grooves, at least one of the sets including, in a repeating pattern, at least two groove side angles that differ from one another, whereby the array of cube-corner retroreflective elements is divided into repeating sub-arrays that each comprise a plurality of cube-corner retroreflective elements in a plurality of distinctive shapes that retroreflect incident light in distinctively shaped light patterns.

2. Retroreflective article of claim 1 in which at least two of the sets of V-shaped grooves include, in a repeating pattern, at least two groove side angles that differ from one another.

3. Retroreflective article of claim 2 in which said at least two sets of grooves include, in a repeating pattern, at least two different groove side angles that differ from the angle needed for all dihedral angles of cube-corner retroreflective elements defined by those groove side angles to be orthogonal.

4. Retroreflective article of claim 2 in which substantially all of the groove side angles in said at least two sets of grooves differ from the angle needed for all dihedral angles of cube-corner retroreflective elements defined by those groove side angles to be orthogonal.

5. Retroreflective article of claim 1 in which all three sets of V-shaped grooves include, in a repeating pattern, at least two groove side angles that differ from one another.

6. Retroreflective article of claim 5 in which all three sets of V-shaped grooves include, in a repeating pattern, at least two different groove side angles that differ from the angle needed for all dihedral angles of cube-corner retroreflective elements defined by those groove side angles to be orthogonal.

7. Retroreflective article of claim 5 in which substantially all the groove side angles of said three sets of grooves differ from the angle needed for all dihedral angles of cube-corner retroreflective elements defined by those groove side angles to be orthogonal.

8. Retroreflective article or claim which said at least one set of grooves includes in a repeating pattern at least two different groove side angles that differ from the angle needed for all dihedral angles of cube-corner retroreflective elements defined by those groove side angles to be orthogonal.

9. Retroreflective article of claim 1 in which substantially all of the groove side angles in the repeating pattern of said at least one set differ from the angle needed for all dihedral angles of cube-corner retroreflective elements defined by those groove side angles to be orthogonal.

10. Retroreflective article of claim 1 in which the cube-corner retroreflective elements of the array of elements are arranged in pairs of elements, so that each distinctively shaped element is matched by a similarly shaped element rotated 180 degrees from the first element.

11. Retroreflective article of claim 1 in which the pattern of at least one set includes an a-b-b-a pattern, where "a" and "b" are each a different groove side angle.

12. Retroreflective article of claim 1 in which the pattern of at least one set includes an a-b-b-a pattern, and the pattern of another set includes a c-d-d-c pattern, where "a" and "b" are each a different groove side angle and "c" and "d" are each a different groove side angle.

13. Retroreflective article of claim 1 in which $$N_u < C,$$

where $N_u$ is the potential number of different cube-corner retroreflective elements in a sub-array, as determined by the equation $$N_u = 2(mno/F),$$

where m, n, and o are the number of grooves in a repeating pattern in the three respective sets of grooves, and F is the largest single whole number factor that can be divided evenly into each of the individual numbers m, n, and o, and C is the possible number of combinations calculated from $$C = 2\ (mno).$$

14. Retroreflective article of claim 1 which exhibits a Design Efficiency Factor of at least 25 percent, where Design Efficiency Factor $= (2)(m+n+o)(100)/N_u$, m, n, o, are the number of grooves in a repeating pattern in the three respective sets of grooves, $N_u = 2(mno/F)$, and F is the largest single whole number factor that can be divided evenly into each of the individual numbers m, n, and o.

15. Retroreflective article of claim 14 which exhibits a Design Efficiency Factor of at least 50 percent.

16. Retroreflective article of claim 1 in which the groove side angles are chosen so as to form cube-corner retroreflective elements that concentrate more reflected light into certain regions of the divergence profile of the retroreflective article than in other regions.

17. Retroreflective article of claim 16 in which the regions of greater concentration of light correspond to smaller observation angles than the regions of lesser concentration of light.

18. Retroreflective article of claim 1 from which 0°-entrance-angle light is retroreflected with a profile as shown in FIG. 9.

19. Retroreflective article of claim 18 wherein a greater proportion of the retroreflected light is directed into the center region of the profile than into other regions.

20. Retroreflective article of claim 1 in the form of a traffic control sign in which the summation of the different light patterns in which the different cube-corner retroreflective elements in a sub-array retroreflect incident light produces an overall retroreflective divergence profile that more closely matches the expected observation profile for the sign than would the retroreflective divergence profile from an article in which all the cube-corner retroreflective elements of said array are identical.

21. Retroreflective article of claim 20 in which the groove side angles are chosen so as to form cube-corner retroreflective elements that concentrate more reflected light into certain regions of the divergence profile than in other regions.

22. Retroreflective article of claim 1 in which said light pattern is more rotationally asymmetric than the light pattern from an article in which all the grooves of said sets are identical, said light pattern having the shape of a graphic image.

23. Retroreflective article of claim 22 in which the graphic image is in the shape of an arrow.

24. Retroreflective article of claim 1 in which the cube-corner retroreflective elements of the array of elements are arranged in pairs of elements rotated 180 degrees apart, and the shapes of an adjacent pair of elements are different from one another.

25. Retroreflective article of claim 1 made from tooling that was prepared by grooving a planar surface that comprised a bundle of individual pins, the portion of the planar surface formed by each pin being at least as large in area as the area of an individual sub-array, with at least some of the pins being rotated after the grooving operation was completed and then reassembled together.

26. Retroreflective article of claim 1 in which the optical axes of at least some of the cube-corner retroreflective elements are tilted toward one edge of that element to increase the entrance angularity of the article.

27. Retroreflective article of claim 1 in which the pattern of at least one set includes an a-b-b-a pattern, the pattren of another set includes a c-d-e-f-d-c-f-e pattern, and the pattern of another set includes an a-b-a-b-b-a-b-a pattern, where the letters "a" through "f" each represent a different groove side angle.

28. Retroreflective article which carries on one side an array of cube-corner retroreflective elements, the three lateral reflecting faces of the elements being formed by three intersecting sets of parallel V-shaped grooves, at least one of the sets including, in a repeating pattern, at least two groove side angles that differ from one another whereby the array of cube-corner retroreflective elements is divided into repeating sub-arrays that each comprise a plurality of cube-corner retroreflective elements in a plurality of distinctive shapes that retroreflect incident light in distinctively shaped light patterns, the summation of the distinctively shaped light patterns producing an overall retroreflective light pattern that has greater rotational symmetry than the retroreflective light pattern from an article in which all the cube-corner retroreflective elements of said array are identical.

29. Retroreflective article of claim 28 in which the optical axes of at least some of the cube-corner retroreflective elements are tilted toward one edge of that element to increase the entrance angularity of the article.

30. Retroreflective article of claim 29 in which the pattern of at least one set includes an a-b-b-a pattern, where "a" and "b" are each a different groove side angle.

31. Retroreflective article of claim 29 in which the pattern of at least one set includes an a-b-b-a pattern, and the pattern of another set includes a c-d-d-c pattern, where "a" and "b" are each a different groove side angle and "c" and "d" are each a different groove side angle.

32. Retroreflective article of claim 28 in which the pattern of at least one set is an a-b-b-a pattern, the pattern of another set is a c-d-e-f-d-c-f-e pattern, and the pattern of another set is an a-b-a-b-b-a-b-a pattern, where the letters "a" through "f" each represent a different groove side angle.

33. Retroreflective article of claim 32 in which the angles "a" through "f" exceed or are less than the angle required to produce orthogonal dihedral angles by the following values in arc-minutes:

a= +2.3
b= −5
c= +2.3
d= +2.3
e= +2.3
f= −5.

34. Retroreflective article of claim 33 in which the spacing between the center points of adjacent grooves defined by the "a" and "b" angles is 0.016 inch and the spacing between the center points of adjacent grooves defined by the "c"–"f" angles is 0.013948 inch.

35. Retroreflective article of claim 33 in which the spacing between the grooves defined by the "a" and "b" angles is 1/p times 0.016 inch, where "p" is a constant; the spacing between the grooves defined by the "c" through "f" angles is 1/p times 0.013948 inch; and "a" through "f" have the values listed in claim 39 multiplied by p.

36. Retroreflective article of claim 35 in which "p" is between about 2 and 2.67.

37. Retroreflective article of claim 29 in which the pattern of at least one set includes an a-b-b-a pattern, the pattern of another set includes a c-d-d-c pattern, and the pattern of a third set includes an a-b-a-b-b-a-b-a pattern, where the letters "a" through "d" each represent a different groove side angle.

38. Retroreflective article of claim 37 in which the angles "a" through "d" exceed or are less than the angle needed to produce orthogonal dihedral angles by the following values in arc-minutes:

a= +2.3
b= −5
c= +2.3
d= −5.

39. Retroreflective article of claim 29 in which at least one groove side angle in at least one set of grooves exceeds, and at least one other groove side angle of the same set of grooves is less than, the angle that would produce an orthogonal intersection with other faces of elements defined by those groove sides.

40. Retroreflective article of claim 27 in which at least two of the sets of V-shaped grooves include, in a repeating pattern, at least two groove side angles that differ from one another.

41. Retroreflective article of claim 27 in which all three sets of V-shaped grooves include, in a repeating pattern, at least two groove side angles that differ from one another.

42. Retroreflective article of claim 41 in which all three sets of V-shaped grooves include, in a repeating pattern, at least two different groove side angles that differ from the angle needed for all dihedral angles of cube-corner retroreflective elements defined by those groove side angles to be orthogonal.

43. Retroreflective article of claim 41 in which substantially all the groove side angles of said three sets of grooves differ from the angle needed for all dihedral angles of cube-corner retroreflective elements defined by those groove side angles to be orthogonal.

44. Retroreflective article of claim 28 in which said at least one set of grooves includes in a repeating pattern, at least two different groove side angles that differ from the angle needed for all dihedral angles of cube-corner retroreflective elements defined by those groove side angles to be orthogonal.

45. Retroreflective article of claim 28 in which the cube-corner retroreflective elements of the array of elements are arranged in pairs of elements, so that each distinctively shaped element is matched by a similarly shaped element rotated 180 degrees from the first element.

46. Retroreflective article of claim 28 in which the pattern of at least one set includes an a-b-b-a pattern, where "a" and "b" are each a different groove side angle.

47. Retroreflective article of claim 28 in which at least one groove side angle in at least one set of grooves exceeds, and at least one other groove side angle of the same set of grooves is less than, the angle that would produce an orthogonal intersection with other faces of elements defined by those groove sides.

48. Retroreflective article which carries on one side an array of cube-corner retroreflective elements, the three lateral reflecting faces of the elements being formed by three intersecting sets of parallel V-shaped grooves, at least one of the sets including, in a repeating pattern, at least two groove side angles that differ from one another, whereby the array of cube-corner retroreflective elements is divided into repeating sub-arrays that each comprise a plurality of cube-corner retroreflective elements in a plurality of distinctive shapes that retroreflect incident light in distinctively shaped light patterns, at least one groove side angle in the repeating pattern of at least one set of grooves exceeding, and at least one groove side angle of the same pattern being less than, the angle that would produce an orthogonal intersection with other faces of elements defined by those groove sides.

49. Retroreflective article of claim 48 in which at least two of the sets of V-shaped grooves include, in a repeating pattern, at least two groove side angles that differ from one another.

50. Retroreflective article of claim 49 in which the repeating pattern of each of said two sets of grooves includes at least one groove side angle that exceeds, and at least one groove side angle that is less than, the angle needed for all dihedral angles of cube-corner retroreflective elements defined by those groove side angles to be orthogonal.

51. Retroreflective article of claim 48 in which all three sets of V-shaped grooves include, in a repeating pattern, at least two groove side angles that differ from one another.

52. Retroreflective article of claim 51 in which the repeating pattern of each of the three sets of grooves includes at least one groove side angle that exceeds, and at least one groove side angle that is less than, the angle needed for all dihedral angles of cube-corner retroreflective elements defined by those groove side angles to be orthogonal.

53. Retroreflective article of claim 52 in which substantially all of the groove side angles of the three sets of grooves differ from the angle needed for all dihedral angles of cube-corner retroreflective elements defined by those groove side angles to be orthogonal.

54. Retroreflective article of claim 51 in which substantially all the groove side angles of said three sets of grooves differ from the angle needed for all dihedral angles of cube-corner retroreflective elements defined by those groove side angles to be orthogonal.

55. Retroreflective article of claim 48 in which the cube-corner retroreflective elements of the array of elements are arranged in pairs of elements, so that each distinctively shaped element is matched by a similarly shaped element rotated 180 degrees from the first element.

56. Retroreflective article of claim 48 in which the pattern of at least one set includes an a-b-b-a pattern, where "a" and "b" are each a different groove side angle.

57. Retroreflective article of claim 48 in which the pattern of at least one set includes an a-b-b-a pattern, and the pattern of another set includes a c-d-d-c pattern, where "a" and "b" are each a different groove side angle and "c" and "d" are each a different groove side angle.

58. Thin flexible retroreflective sheet material which carries on one large-area side a dense arry of cube-corner retroreflective elements, the three lateral reflecting faces of the elements being formed by three intersecting sets of parallel V-shaped grooves, each of the sets including, in a repeating pattern, at least two groove side angles that differ from one another, the repeating patterns in the sets of grooves generating repeating sub-arrays that compose the whole array, have lineal dimensions of no more than about one centimeter, and each comprise a plurality of distinctively shaped non-orthogonal cube-corner retroreflective elements that retroreflect incident light in distinctively shaped light patterns.

59. Retroreflective sheet material of claim 58 in which at least one groove side angle in a set of grooves exceeds, and at least one other groove side angle of the same set is less than, the angle that would produce an orthogonal intersection with other faces of elements defined by those groove sides.

60. Retroreflective sheet material of claim 59 in which the summation of the different light patterns in which different cube-corner retroreflective elements in a sub-array retroreflect incident light produces an overall retroreflective light pattern that has greater rotational symmetry than the retroreflective light pattern from an article in which all the cube-corner retroreflective elements of said at least array are identical.

61. Retroreflective sheet material of claim 59 in which the optical axes of at least some of the cube-corner retroreflective elements are tilted toward one edge of that element to increase the entrance angularity of the sheet material.

62. Retroreflective sheet material of claim 61 in which the summation of the different light patterns in which different cube-corner retroreflective elements in a sub-array retroreflect incident light produces an overall retroreflective light pattern that has greater rotational symmetry than the retroreflective light pattern from an article in which all the cube-corner retroreflective elements of said at least array are identical.

63. Retroreflective sheet material of claim 58 in which the summation of the different light patterns in which the different cube-corner retroreflective elements in a sub-array retroreflect incident light produces an overall retroreflective light pattern that has greater rotational symmetry than the retroreflective light pattern from an article in which all the cube-corner retroreflective elements of said array are identical.

64. Retroreflective sheet material of claim 58 in which at least one set of grooves includes in a repeating pattern at least two different groove side angles that differ from the angle needed for all dihedral angles of cube-corner retroreflective elements defined by those groove side angles to be orthogonal.

65. Retroreflective sheet material of claim 58 in which all three sets of V-shaped grooves include, in a repeating pattern, at least two different groove side angles that differ from the angle needed for all dihedral angles of cube-corner retroreflective elements defined by those groove side angles to be orthogonal.

66. Retroreflective sheet material of claim 58 in which substantially all the groove side angles of said three sets of grooves differ from the angle needed for all dihedral angles of cube-corner retroreflective elements defined by those groove side angles to be orthogonal.

67. Retroreflective sheet material of claim 58 in which the pattern of at least one set includes an a-b-b-a pattern, where "a" and "b" are each a different groove side angle.

68. Retroreflective sheet material of claim 58 in which $$N_u < C,$$

where $N_u$ is the potential number ($N_u$) of different cube-corner retroreflective elements in a sub-array as determined by the equation $$N_u = 2(mno/F),$$

where m, n, and o are the number of grooves in a repeating pattern in the three respective sets of grooves, and F is the largest single whole number factor that can be divided evenly into each of the individual members m, n, and o, and C is the possible number of combinations calculated from $$C = 2(mno).$$

69. Retroreflective sheet material of claim 58 which exhibits a Design Efficiency Factor of at least 25 percent, where Design Efficiency Factor$=(2)(m+n+o)(100)/N_u$, and m, n, o are the number of grooves in a repeating pattern in the three respective sets of grooves, $N_u = 2(mno/F)$, and F is the largest single whole number factor that can be divided evenly into each of the individual numbers m, n, and o.

70. Retroreflective sheet material of claim 66 which exhibits a Design Efficiency Factor of at least 50 percent.

71. Retroreflective sheet material of claim 58 in which the groove side angles are chosen so as to form cube-corner retroreflective elements that concentrate more reflected light into certain regions of the divergence profile of the retroreflective sheet material than in other regions.

72. Retroreflective sheet material of claim 71 in which the regions of greater concentration of light correspond to smaller observation angles than the regions of lesser concentration of light.

73. Retroreflective sheet material of claim 58 from which 0°-entrance-angle light is retroreflected with a profile as shown in FIG. 9.

74. Retroreflective sheet material of claim 73 wherein a greater proportion of the retroreflected light is directed into the center region of the profile than into other regions.

75. Traffic control sign covered with retroreflective sheet material of claim 58 in which the summation of the different light patterns in which the different cube-corner retroreflective elements in a sub-array retroreflect incident light produces an overall retroreflective divergence profile that more closely matches the expected observation profile for the sign than would the retroreflective divergence profile from a sheet material in which all the cube-corner elements of said arrays are identical.

76. Traffic control sign of claim 75 in which the groove side angles are chosen so as to form cube-corner retroreflective elements that concentrate more reflected light into certain regions than into other regions.

77. Retroreflective sheet material of claim 58 made from tooling that was prepared by grooving a planar surface that comprised a bundle of individual pins, the portion of the planar surface formed by each pin being at least as large in area as the area of an individual sub-array, with at least some of the pins being rotated after the grooving operation was completed and then reassembled together.

78. Retroreflective sheet material of claim 58 in which the optical axes of at least some of the cube-corner retroreflective elements are tilted toward one edge of that element to increase the entrance angularity of the sheet material.

79. Retroreflective sheet material of claim 78 in which the summation of the different light patterns in which different cube-corner retroreflective elements in a sub-array retroreflect incident light produces an overall retroreflective light pattern that has greater rotational symmetry than the retroreflective light pattern from an article in which all the cube-corner retroreflective elements of said array are identical.

* * * * *

UNITED STATES PATENT AND TRADEMARK OFFICE
CERTIFICATE OF CORRECTION

PATENT NO. : 4,775,219

DATED : October 4, 1988

INVENTOR(S) : Roger H. Appeldorn, John C. Nelson, Mark E. Gardiner, and Timothy L. Hoopman It is certified that error appears in the above-identified patent and that said Letters Patent is hereby corrected as shown below:

Column 3, line 40, "is" should be -- as --.

Column 13, line 59, "wer" should be -- were --.

Column 15, line 56, "11.25inchXX11 inch" should be -- 11.25 inch x 11 inch --.

Column 18, line 24, "angles" should be -- angles --.

Column 21, line 10, "Profile13" should be -- Profile - --.

Column 23, line 43, "pattren" should be -- pattern --.

Signed and Sealed this

Eleventh Day of July, 1989

Attest:

DONALD J. QUIGG

Attesting Officer

Commissioner of Patents and Trademarks